US010708235B2

(12) United States Patent
Zafaranchi et al.

(10) Patent No.: US 10,708,235 B2
(45) Date of Patent: Jul. 7, 2020

(54) SYSTEM AND DEVICES FOR ENABLING ANONYMOUS COMMUNICATION BASED ON MOTOR VEHICLE IDENTIFIERS

(71) Applicant: ZZGULU LLC, Irvine, CA (US)

(72) Inventors: Alireza Zafaranchi, Irvine, CA (US); Behzad Yari, Irvine, CA (US)

(73) Assignee: ZZGULU LLC, Irvine, CA (US)

( * ) Notice: Subject to any disclaimer, the term of this patent is extended or adjusted under 35 U.S.C. 154(b) by 0 days.

(21) Appl. No.: 16/495,079

(22) PCT Filed: Mar. 28, 2018

(86) PCT No.: PCT/US2018/024967
§ 371 (c)(1),
(2) Date: Sep. 17, 2019

(87) PCT Pub. No.: WO2018/183577
PCT Pub. Date: Oct. 4, 2018

(65) Prior Publication Data
US 2020/0092262 A1    Mar. 19, 2020

Related U.S. Application Data

(60) Provisional application No. 62/480,304, filed on Mar. 31, 2017.

(51) Int. Cl.
*H04L 29/06* (2006.01)
*G06F 16/732* (2019.01)
(Continued)

(52) U.S. Cl.
CPC ........ *H04L 63/0421* (2013.01); *G06F 16/252* (2019.01); *G06F 16/7335* (2019.01); *G06F 16/953* (2019.01); *G06F 16/9538* (2019.01)

(58) Field of Classification Search
CPC ............. H04L 63/0421; G06F 16/7335; G06F 16/953; G06F 16/9538; G06F 16/252
See application file for complete search history.

(56) References Cited

U.S. PATENT DOCUMENTS 8,713,121 B1    4/2014  Bain et al.
9,648,107 B1 *  5/2017  Penilla ................... B60L 58/12
(Continued)

OTHER PUBLICATIONS

PCT/US2018/024967. Corrected Int'l Preliminary Report on Patentability (dated Apr. 16, 2019). 26 pages.
(Continued)

*Primary Examiner* — Ghodrat Jamshidi
(74) *Attorney, Agent, or Firm* — Loza & Loza, LLP; David S. Sarisky

(57) ABSTRACT

A device implements anonymous communication between users through an anonymous communication system. The device transmits a search query to a server of the anonymous communication system, where the search query corresponds to a motor vehicle identifier. The device receives from the server, an indication of whether the motor vehicle identifier is registered or is not registered with the anonymous communication system. If the motor vehicle identifier is registered, the device enables creation of content to be communicated and transmits the content to the server for retransmission to a device associated with the registered motor vehicle identifier. If, however, the motor vehicle identifier is not registered, the device presents a mechanism to enable creation of content to be communicated and transmits the content to the server for storage and retransmission to a device associated with the motor vehicle identifier if the motor vehicle identifier subsequently becomes registered with the anonymous communication system.

17 Claims, 17 Drawing Sheets

(51) Int. Cl.
*G06F 16/953* (2019.01)
*G06F 16/9538* (2019.01)
*G06F 16/25* (2019.01)

(56) References Cited

U.S. PATENT DOCUMENTS

| | | | | |
|---|---|---|---|---|
| 2002/0165024 A1* | 11/2002 | Puskala | ........... | A63F 13/12 |
| | | | | 463/40 |
| 2005/0120309 A1 | 6/2005 | Jang | | |
| 2007/0222555 A1* | 9/2007 | Tengler | ........... | H04L 9/3263 |
| | | | | 340/5.6 |
| 2010/0019932 A1* | 1/2010 | Goodwin | ........... | G08G 1/162 |
| | | | | 340/902 |
| 2011/0196969 A1* | 8/2011 | Tarte | ........... | H04N 21/41422 |
| | | | | 709/227 |
| 2011/0228920 A1* | 9/2011 | Kagawa | ........... | H04L 63/0407 |
| | | | | 379/201.11 |
| 2012/0034876 A1* | 2/2012 | Nakamura | ........... | H04L 9/321 |
| | | | | 455/66.1 |
| 2014/0028477 A1* | 1/2014 | Michalske | ........... | G08G 1/005 |
| | | | | 340/990 |
| 2015/0089236 A1* | 3/2015 | Han | ........... | H04L 9/3271 |
| | | | | 713/181 |
| 2015/0113012 A1* | 4/2015 | Silver | ........... | H04L 51/38 |
| | | | | 707/758 |
| 2015/0195411 A1 | 7/2015 | Krack et al. | | |
| 2015/0249635 A1 | 9/2015 | Thrower, III et al. | | |
| 2016/0295401 A1* | 10/2016 | Berge | ........... | H04W 12/02 |
| 2016/0344701 A1* | 11/2016 | Martens | ........... | H04L 63/0421 |
| 2017/0345100 A1* | 11/2017 | Bowie | ........... | G06Q 40/08 |
| 2017/0359365 A1* | 12/2017 | van den Berg | ........... | H04W 12/04 |
| 2018/0027600 A1* | 1/2018 | Lawlis | ........... | H04L 9/0825 |
| | | | | 713/168 |

OTHER PUBLICATIONS

PCT/US2018/024967. Int'l Search Report & Written Opinion (dated Jul. 11, 2018). 14 pages.

* cited by examiner

200

202 — Vehicle Info
- Vehicle ID (active/inactive)
- Make
- Model
- Color
- Vehicle insurance
- Vehicle photo 204 — User Info Authorized User (Owner)
- Username
- Password
- Name
- Address
- Email address
- Mobile #
- Landline #
- Personal photo Other User 1
- Username
- Password
- Name
- Address
- Email address
- Mobile #
- Landline #
- Personal photo

FIG. 2

SYSTEM AND DEVICES FOR ENABLING ANONYMOUS COMMUNICATION BASED ON MOTOR VEHICLE IDENTIFIERS

CROSS-REFERENCE TO RELATED APPLICATIONS

This application is a U.S. national phase application of and claims priority to International Application No. PCT/US2018/024967, entitled "System and Devices for Enabling Anonymous Communication Based on Motor Vehicle Identifiers" and filed on Mar. 28, 2018, which claims the benefit of U.S. Provisional Application Ser. No. 62/480,304, entitled "Mobile Application for Vehicle Specific Communication" and filed on Mar. 29, 2017, the entire disclosures of which are incorporated herein by reference.

FIELD

The present disclosure relates generally to systems for communication, and more particularly, to system servers and client devices for enabling anonymous communication based on motor vehicle identifiers.

BACKGROUND

In the $21^{st}$ century mobile telephones and motor vehicles (many of the later models having on-board computers) are indispensable tools of life in both the developed and developing world. Using mobile telephones users are not only able to make and receive telephone calls and text messages in most populated regions of the world, but an increasing number of cellular telephones (i.e., "smart" telephones) permit one to send and receive emails and to take and send photos and videos to other users.

With respect to motor vehicles, it is estimated that there are over 1 billion automobiles, trucks and buses operational in the world today. In the United States there are 253 million automobiles on the road, with about 73% of the population owning an automobile. In underdeveloped countries where the cost of an automobile is often beyond the means of an average person motorcycles and motorbikes are often owned by the majority of people—not only as a means of single person transportation, but also as a means of transporting goods to and from market. By way of example, in Ho Chi Minh City, Vietnam's largest city with a population of 8 million people, there are 7.5 million motorbikes registered in the city, with another 1 million motorbikes brought into the city by migrants from other parts of Vietnam. In virtually every country, these vehicles are registered with local, state (or provincial) or national governmental entities. Similarly, other vehicles such as boats and aircrafts must also be registered with governmental authorities.

With so many motor vehicles owned and on the road, in any given location accidents, theft of motor vehicles, and other mishaps are everyday occurrences. Moreover, there is often a reason for a person to want to contact the driver, passenger or owner of a vehicle without having that person's contact information.

There are a multitude of scenarios in which it would be desirable to be able to privately and securely communicate with the operator or owner of a particular vehicle where the operator cannot be located or identified. For instance, when a vehicle operator has a collision with a parked car, and would like to leave their information, the placement of a note under the windshield-wiper is not a reliable method of communication. Further, it may not be feasible during inclement weather such as rain or snow. There are other more time-sensitive situations where the operator of a vehicle needs to be contacted but cannot be identified or otherwise located. For example, if a vehicle operator left their lights on, left their window down in the rain, left something on the vehicle roof, missing gas cap, oil/gas leak, left the vehicle gas tank lid open, illegally parked and about to get towed or ticketed, keys left in vehicle door, unsafe fluid leak from vehicle, the vehicle has been broken into, or more critically, left their pet/child in the car on a hot day with the windows up.

In these situations, there is typically no way to contact the operator of the vehicle, such as where the vehicle is parked in a parking lot or structure at a mall, shopping center, workplace, concert or sporting event. Alternatively, one may see a vehicle driving by and want to communicate with the driver for a variety of reasons. For example, one may see a particular person in the vehicle they would like to contact, or to comment or inquire about the vehicle or its features (e.g. type of wheels, inquire as to vehicle sale, custom exhaust, paint job, etc.).

SUMMARY

Embodiments disclosed herein include client-side and server-side apparatuses and corresponding methods that enable anonymous communication. In one embodiment, a communication device for facilitating anonymous communication by a user of the device with one or more other devices includes a user interface, a network interface and a processor coupled to each of the user interface and the network interface. The communication device may be a mobile telephone, vehicle on-board computer or any smart device. The processor, operating in accordance with application instructions stored in a computer-readable medium, enables the device to implement anonymous communication between users through an anonymous communication system. To this end, the device transmits a search query to a server of the anonymous communication system, where the search query corresponds to a motor vehicle identifier, such as a license plate number. The device subsequently receives from the server, an indication of whether the motor vehicle identifier is registered or is not registered with the anonymous communication system.

If the motor vehicle identifier is registered, the device enables through the user interface, creation of content to be communicated and transmits the content to the server for retransmission to a device associated with the registered motor vehicle identifier. A device is "associated with a registered motor vehicle identifier" when the device is logged into an account of the anonymous communication system that corresponds to, or is linked with, the registered motor vehicle identifier. The content is by default, devoid of any information that would enable identification of the user or enable another mode of communication with the user. If, however, the motor vehicle identifier is not registered, the device presents through the user interface a mechanism to enable creation of content to be communicated in the future and transmits the content to the server for storage within the anonymous communication system and retransmission to a device associated with the motor vehicle identifier if the motor vehicle identifier subsequently becomes registered with the anonymous communication system.

In another embodiment, a server for facilitating anonymous communication by a user of a communication device with one or more other communication devices includes a network interface and a processor coupled to the network interface. The processor, operating in accordance with application instructions stored in a computer-readable medium, enables the server to implement anonymous communication between users through an anonymous communication system. To this end, the server receives a search query from a device, where the query corresponds to a motor vehicle identifier, and searches a database for the motor vehicle identifier to determine whether the motor vehicle identifier is registered with the anonymous communication system or is unregistered. The server subsequently transmits to the device, an indication of whether the motor vehicle identifier is registered or unregistered, and receives content from the device. The content is by default, devoid of any personal information that would enable identification of the user or enable another mode of communication with the user.

If the motor vehicle identifier is registered, the server retransmits the content to a device associated with the motor vehicle identifier. If, however, the motor vehicle identifier is unregistered, the server stores the content in a memory, monitors the database for a subsequent registration of the motor vehicle identifier with the anonymous communication system, and transmits the content to a device associated with the motor vehicle identifier when the motor vehicle identifier becomes registered. Once again, a device is "associated with a registered motor vehicle identifier" when the device is logged into an account of the anonymous communication system that corresponds to, or is linked with, the registered motor vehicle identifier.

In another embodiment, a communication device for facilitating anonymous broadcast communication by a user of the device with one or more other devices includes a user interface, a network interface and a processor coupled to the user interface and the network interface. The processor, operating in accordance with application instructions stored in a computer-readable medium, enables the device to implement an anonymous broadcast communication from one device to one or more other devices, where each device is associated with a motor vehicle identifier registered with an anonymous communication system. Again, as previously mentioned, a device is "associated with a registered motor vehicle identifier" when the device is logged into an account of the anonymous communication system that corresponds to, or is linked with, the registered motor vehicle identifier. To this end, the device enables through the user interface, creation of content to be broadcast, wherein the content is by default, devoid of any information that would enable identification of the user or enable another mode of communication with the user.

The device obtains information associated with one or more devices that are both of: 1) associated with a motor vehicle identifier that is registered with the anonymous communication system, and 2) within a broadcast radius. Information associated with the one or more devices may correspond to one or more pieces of vehicle information or user information that are included in the account records of the anonymous communication system that the device is logged into. In one aspect of this embodiment, the device obtains information associated with one or more devices that are within the broadcast radius by presenting through the user interface, a mechanism for selecting the broadcast radius, transmitting the selected broadcast radius to a server, and receiving the information for each of the one or more devices that are within the selected broadcast radius, from the server. In another aspect of this embodiment, the device obtains information associated with one or more devices that are within the broadcast radius by detecting the one or more devices that are within the broadcast radius using proximity technology, e.g., Bluetooth, and receiving the information for each of the one or more devices directly from the devices. After obtaining the information, the device presents through the user interface, a mechanism for selecting one or more of the devices for reception of the broadcast content. The device then transmits the broadcast content to the server, together with an indication of the one or more selected devices.

In another embodiment, a server for facilitating anonymous broadcast communication by a user of a device with one or more other devices includes a network interface and a processor coupled to the network interface. The processor, operating in accordance with application instructions stored in a computer-readable medium, enables the server to implement an anonymous broadcast communication from one device to one or more other devices, where each device is associated with a motor vehicle identifier registered with an anonymous communication system. To this end, the server receives a selected broadcast radius from a device and searches a database for devices within the selected broadcast radius that are associated with a motor vehicle identifier that is registered with an anonymous communication system. Again, as previously mentioned, a device is "associated with a registered motor vehicle identifier" when the device is logged into an account of the anonymous communication system that corresponds to, or is linked with, the registered motor vehicle identifier. The server transmits to the device, information for each located device. This information may correspond to one or more pieces of vehicle information or user information that are included in the account records of the anonymous communication system that the device is logged into. The server then receives broadcast content from the device, together with an indication of one or more devices that have been selected to receive the broadcast content; and transmits the broadcast content to the one or more selected devices. The broadcast content is by default, devoid of any information that would enable identification of the user or enable another mode of communication with the user.

In another embodiment, a communication device includes a user interface, a network interface and a processor coupled to the user interface and the network interface. The processor, operating in accordance with application instructions stored in a computer-readable medium, enables the communication device to engage in anonymous communication with other devices within proximity of the communication device while it is logged into an account of an anonymous communication system. To this end, the communication device obtains information on one or more second devices, each of the one or more second devices being both of: 1) logged into an account of the anonymous communication system, and 2) within a predetermined distance of the first device, and presents, through the user interface, the information on each of the one or more second devices. The device then enables through the user interface, selection of at least one of the one or more second devices for receipt of anonymous communication content, and creation of anonymous communication content. The anonymous communication content is by default, devoid of any information that would enable identification of the user of the communication device or enable another mode of communication with the user. The communication device then transmits, through the network interface, the content to a server of the anonymous communication system, together with an indication of the selected at least one second device.

In another embodiment, a communication device stores a location of a motor vehicle having a vehicle network interface. The device includes a user interface, a device network interface configured to detect, pair with, and connect with one or more vehicle network interfaces, and a processor coupled to the user interface and the device network interface. The processor, operating in accordance with application instructions stored in a computer-readable medium, enables the device to store a location of a motor vehicle while the communication device is logged into an account of an anonymous communication system. To this end, the communication device detects when the device network interface connects with the vehicle network interface of the motor vehicle. After such detection, the communication device detects a continuous disconnection when the device network interface is continuously disconnected from the vehicle network interface for a predetermined period; and transmits an indication of the detection of the continuous disconnection to a server of the anonymous communication system. The communication device then receives from the server, information corresponding to the location of the motor vehicle, and presents, through the user interface, the information together with a mechanism for storing the information on the device.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatuses and methods will now be presented in the detailed description by way of example, and not by way of limitation, with reference to the accompanying drawings, wherein:

FIGS. 2 and 3 are illustrations of information maintained in database records of the anonymous communication system included in FIG. 1.

DETAILED DESCRIPTION

Figure 1:
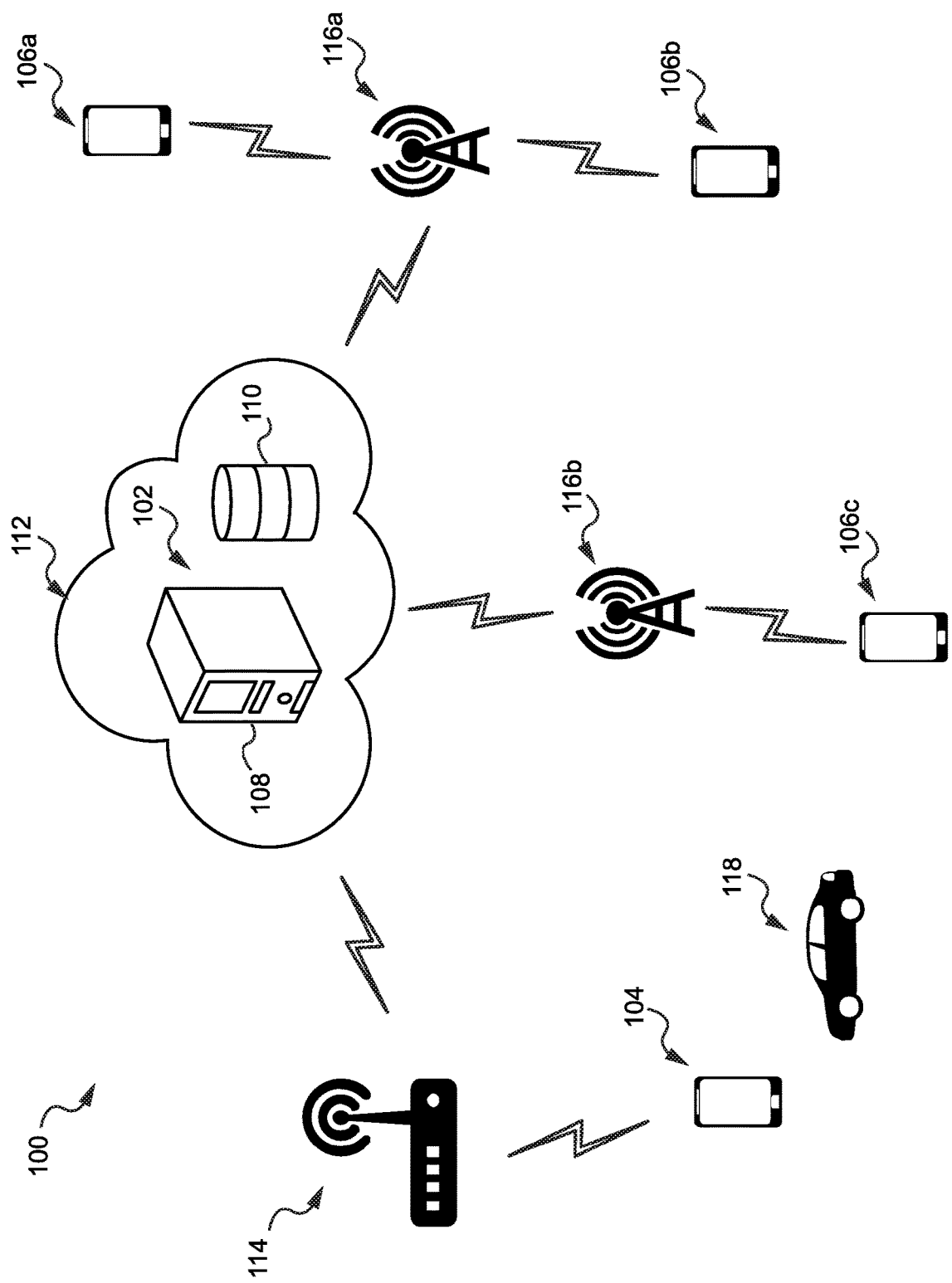
FIG. 1 is an illustration of a network including a communication system having a communication system server and various client devices, that enables anonymous communication between system users based on motor vehicle identifiers.

The detailed description set forth below together with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Disclosed herein is an anonymous communication system, and associated software application, that enables secure and anonymous communication among communication devices and their users based on motor vehicle identifiers, such as license plate numbers. To take advantage of the anonymous communication system and the numerous benefits and features it provides, a user creates an account with the anonymous communication system by accessing an application using a communication device, e.g., a mobile telephone, vehicle on-board computer or any smart device, and registers a motor vehicle with the system. During the account creation and vehicle registration process, the user creates login credentials, e.g., a user name and password, and enters a motor vehicle identifier, e.g., license plate number, for the vehicle being registered. Additional information may also be entered during the account creation and vehicle registration process, including for example, the user's personal information (e.g., full name) and the user's correspondence information (e.g., residential address, email address, phone number, etc.), and vehicle information (e.g. vehicle make and model, vehicle color, vehicle insurance and vehicle photo). All account information, e.g., user information, login credentials, and vehicle information are maintained in secure databases within the communication system.

In a typical use of the anonymous communication system, when a registered user sees a vehicle and would like to communicate with an individual or entity associated with that vehicle, the user requests a communication session by entering the vehicle's license plate number into the anonymous communication system application using a communication device. The individual or entity associated with the vehicle may be an occupant of the vehicle, e.g., the current driver of the vehicle or a passenger of the vehicle. The individual or entity associated with the vehicle, however, does not have to be an occupant of the vehicle, and may be remote from the vehicle. For example, the individual or entity associated with the vehicle may be a parent or friend who is allowing someone else to drive their car, or may be a car rental company or package delivery company with a fleet of vehicles being driven by various individuals.

Upon entry of the vehicle's license plate number, the communication device sends the license plate number to the anonymous communication system server. Upon receipt of the number, the communication system processes the entered information by searching the system databases for the entered license plate number. If the entered license plate number is located within the database (meaning the subject vehicle is registered with the anonymous communication system), the system server informs the requesting user of this, and the requesting user may then create communication content, such as a text message, on his communication device and send it to the communication system. For its part, upon receipt of the communication content the anonymous communication system server retransmits, sends, presents, or otherwise makes available, the content to communication devices that are currently logged into an account of the anonymous communication system that corresponds to, or is linked with, the license plate number.

During any given communication session, the anonymous communication system—by default—refrains from providing the requesting/sending user any personal information (e.g., name) or correspondence information (e.g., residential address, emails address, phone number) associated with the entered license plate number. Likewise, the anonymous communication system—by default—refrains from including any personal information (e.g., name) or correspondence information (e.g., residential address, emails address, phone number) of the requesting/sending user in the communication content. Thus, privacy and anonymity of all parties are strictly maintained.

Having thus provided a general description of the anonymous communication system, a more detailed system overview with example use cases is provided below, followed by more detailed descriptions of the system architecture and operation.

Anonymous Communication System Architecture

With reference to FIG. 1, an anonymous communication system 100 as generally described above, includes server-side devices 102, client-side (or user-side) devices 104, 106a, 106b, 106c and one or more software applications accessible by the respective devices that enable the functionality and features of the communication system. For illustrative purposes, the server-side devices 102 include one or more servers 108 and one or more data storage structures 110. The client-side devices 104, 106a, 106b, 106c may include mobile telephones, vehicle on-board computers, desktop computers, laptop computers, or tablet computers or any smart devices. Throughout this disclosure, server-side devices 102 that perform a serving function may be referred to as "server devices" or "servers," while those that perform a data storage function may be referred to as "data stores" or "databases." Client-side devices 104, 106a, 106b, 106c may be referred to as "client devices" or "user devices" or "communication devices."

Server-side devices 102, e.g., servers 108 and databases 110, may be co-located (e.g., within the same network and/or physical location) or distributed (e.g., within a different network and/or physical location) in relation to each other. For example, one or more of the server-side devices 102 may be associated with an Internet-based (e.g., "cloud"-based) computing environment 112.

Communications between the client devices 104, 106a, 106b, 106c and the server-side devices 102 may be performed by respective device network interfaces that enable wired connections and/or wireless connections. In some configurations, a server device 108 may communicate with a first client device 104 via a first network component 114, and with one or more second client devices 106a, 106b, 106c via one or more second network components 116a, 116b different from the first network component. For example, the server 108 may communicate with a mobile telephone 104 via a local area network (LAN) that utilizes a wireless access point (AP) 114, and with other mobile telephones 106a, 106b, 106c via a cellular network that utilizes one or more access nodes 116a, 116b.

The LAN may implement protocols and/or algorithms that comply with various communication standards of the Institute of Electrical and Electronics Engineers (IEEE), such as IEEE 802.11. The cellular network may implement various types of technologies without deviating from the scope of the present disclosure. For example, the cellular network may implement protocols and/or algorithms that comply with various communication standards of the Third Generation Partnership Project (3GPP) and 3GPP2, such as 3G and 4G (Long Term Evolution), and of the Next Generation Mobile Networks (NGMN) Alliance, such as 5G. Interaction between the client devices and server devices may be based on standard client/server Internet architecture involving Transmission Control Protocol/Internet Protocol (TCP/IP) and Hypertext Transfer Protocol (HTTP) requests.

Vehicle, Device and User Registration

Continuing with reference to FIG. 1, as described above, a motor vehicle 118 may register with the anonymous communication system 100 by accessing a software application of the system via a client device 104, e.g., mobile telephone, vehicle on-board computer, or smart device, and entering information. The information entered includes—at a minimum—the motor vehicle identifier of the motor vehicle 118 and login credentials, i.e., a user defined username and password. The motor vehicle identifier may be the vehicle license plate number (or other vehicle registration information). Personal information, such as the full name of an authorized user of the vehicle, and one or more types of correspondence information, including for example, the authorized user's residential address, email address, mobile number, landline number, etc. may be required to be entered. "Authorized user" in this context refers to an individual or company having an ownership interest in the vehicle. Other information may be entered at the user's option, such as the vehicle insurance provider, a photograph of the vehicle, a photograph of the user, etc.

Figure 3:
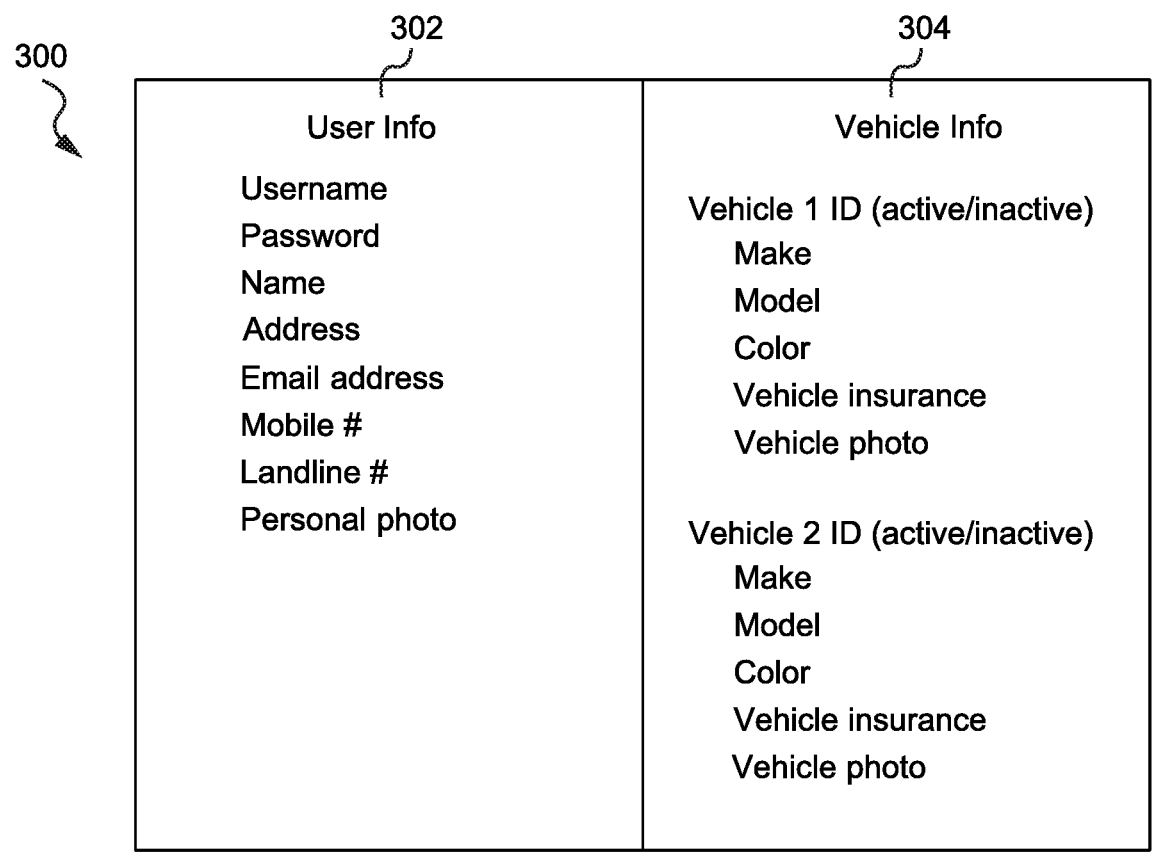

The entered information is then transmitted by the client device 104 to a server 108, where the information is processed and recorded in a database 110. With reference to FIG. 2, which is an illustration of information maintained in a database record 200 from the perspective of an individual motor vehicle linked with multiple authorized users, a database program is structured to maintain records that correlate vehicle information 202, with the user information 204 for multiple users 206. In FIG. 3, which is an illustration of a database record 300 from the perspective of an individual user linked with multiple registered motor vehicles, a database program is structured to maintain records that correlate user information 302, with vehicle information 304 that includes vehicle identifiers and additional vehicle information for multiple vehicles.

To preserve security, the information may be divided and stored on two or more servers 108 to prevent unauthorized access to a user's personal information and correspondence information. Additionally, the server 108 may have the capability to interface with one or more governmental agencies to verify the accuracy of the entered motor vehicle identifier with the other information submitted during the vehicle registration process. For example, the server may have access to department of motor vehicle (DMV) registration information, and based on such information may confirm that the personal information entered during vehicle registration matches that of the DMV. This verification prevents a person having no ownership interest in a motor vehicle from registering the motor vehicle under his personal information and correspondence information.

As noted above with reference to FIG. 2, a registered motor vehicle 118 may have multiple users linked to it. For example, a vehicle registered in the anonymous communication system by an authorized user, e.g., the owner of the vehicle, may be driven by or occupied by various individuals. For other potential drivers or occupants of a registered motor vehicle 118 to be communicated with through the anonymous communication system, the authorized user may add other users to the motor vehicle registration—subject to consent by the persons being added. For example, the authorized user may add a spouse, children or friends to a vehicle registration. Alternatively, the authorized user may invite other people to add themselves to the vehicle registration. Also, an individual may attempt to add himself to a vehicle registration—subject to consent from the authorized user. Once the consent of the registered owner of the vehicle is obtained, the person is added to the vehicle registration.

Individuals added as users to an existing vehicle registration are required to create an account with the autonomous communication system and provide a user defined username and password. Personal information, such as the full name of the user, and correspondence information, including for example, the user's residential address, email address, mobile number, landline number, or a photograph of the user, may also be entered at the user's option. Vehicle information (e.g., motor vehicle identifier, vehicle make and model, vehicle color, vehicle insurance and vehicle photo) for the added user's account will corresponds to that of the existing vehicle registration.

Basic Search and Communication

Figure 4A:
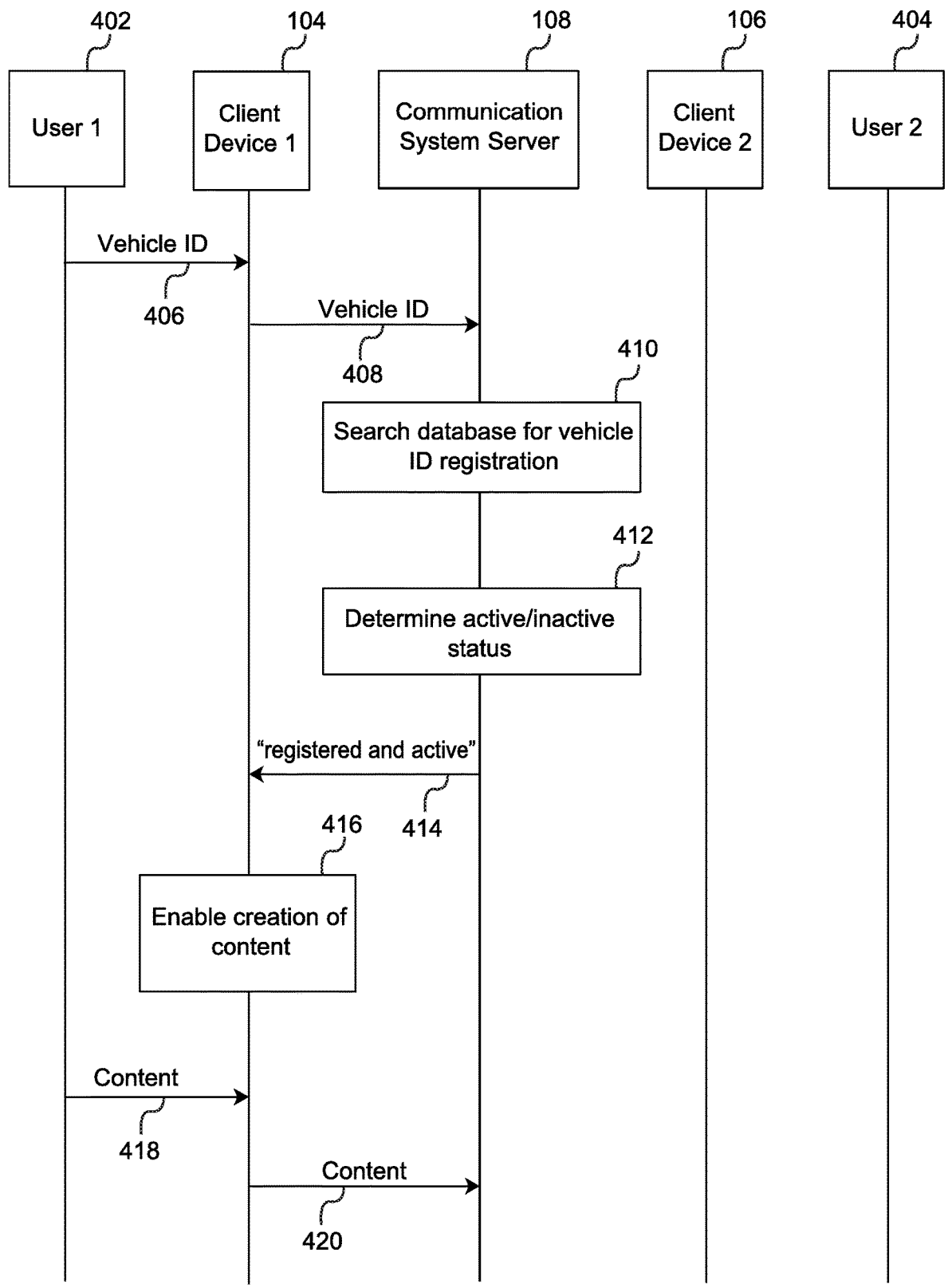
FIGS. 4A and 4B are flow diagrams illustrating the operation of and interaction between various components of the anonymous communication system of FIG. 1.
Figure 4B:
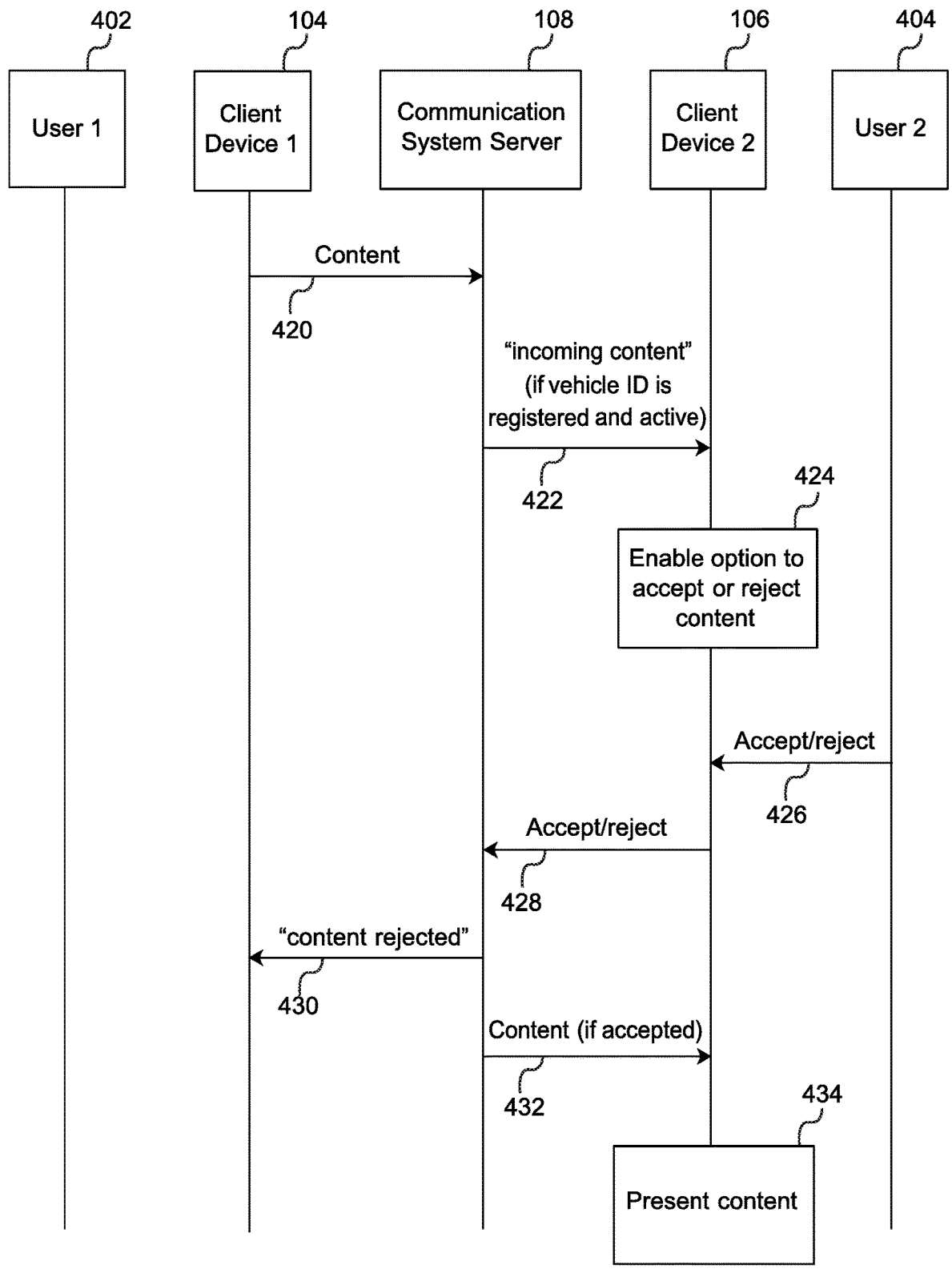

Continuing with FIG. 1, and with additional reference to the flow diagrams of FIGS. 4A and 4B, in an example communication session enabled by the anonymous communication system 100, a user 402 who wishes to communicate with another party 404 (who may be the owner, passenger or driver of a motor vehicle) may access the system application on a client device 104, e.g., a mobile telephone or vehicle on-board computer, and request a communication session with the other user 404. To enable this request, the client device 104 operating in accordance with the system application, presents a graphical user interface (GUI) on the display of the device that allows for the entry of a vehicle identifier (step 406) of the motor vehicle as a search query for the communication system 100. The vehicle identifier may be the license plate number.

Entry of the vehicle identifier can be performed by any suitable data entry means. For example, the number may be entered using the mobile telephone keyboard, by employing the mobile telephone's microphone in conjunction with a voice recognition program (which may be part of the system application functionality), or by taking a photo of the license plate and uploading the photo to a server, which can then interpret the photo using an optical character recognition (OCR) software program (which also may be built into the system application).

Upon entry of the vehicle identifier, the client device 104 operating in accordance with the system application, presents a GUI, e.g., touch button, on the display of the client device 104 that enables transmission of the vehicle identifier (step 408) to the communication system server 108. Upon receipt of the vehicle identifier, the communication system server 108 operating in accordance with the system application, searches for the vehicle identifier in its database 110 (step 410). If the vehicle identifier is in the database 110, which means that the vehicle identifier is registered with the anonymous communication system, the communication system server 108 determines the status of the vehicle identifier (step 412).

The communication system server 108 determines a registered motor vehicle is "active" when at least one communication device is logged into an account of the anonymous communication system that is associated with the motor vehicle identifier. A registered motor vehicle is considered "inactive" if no communication devices are logged into an account of anonymous communication system that is associated with the motor vehicle identifier.

Upon determining the registration status and active/inactive status of the vehicle identifier, a message indicating these determinations is generated by the communication system server 108 and transmitted to the client device 104 (step 414). Assuming the communication system server 108 message indicates to the client device 104 that the vehicle identifier that is the subject of the search query is "registered and active" (step 414) the client device 104 operating in accordance with the system application, presents a GUI on the display of the client device 104 indicating that the vehicle identifier is registered with the communication system and is active, and may present an additional GUI on the display of the client device 104 that enables the creation of communication content (step 416).

Regarding content creation (step 416), the client device 104 operating in accordance with the system application, enables the creation of communication content at the client device 104. In one form of content creation by the user 402 (step 418), the client device 104 may present a GUI, e.g., touch button, on the display through which a plurality of prefixed text messages may be accessed and selected as the content by the user 402. Alternatively, a prefixed text message may be selected by the user 402 through a voice command. Example prefixed messages include but not limited to: "Your headlights are not on"; "Your brake/tail lights are out"; "Hi; I'm <name> in the <color> car near you; let's meet!"; "Your car's interior lights are on"; "I found your car keys; call me at <telephone number>"; "You car is being towed!"; "Your car is being broken into!"; "Thank you!"; "Your car's registration tag has expired!"; "Your trunk is open"; "I hit your car by mistake, call me at <telephone number>"; "police ahead!"; "Obstacle in the road ahead!"; "Follow me!", and the like. In other forms of content creation by the user 402 (step 418), the client device 104 may present a GUI on the display for: 1) initiating a text entry of the content, 2) initiating a visual capture of the content in the form of a picture or video, or 3) initiating an audio capture of the content.

Upon completion of content creation, the client device 104 operating in accordance with the system application, enables the transmission of communication content to communication system server 108 (step 420). In one form of content transmission the client device 104 may present a GUI, e.g., touch button, on the display through which the user 402 may select to send the content. Alternatively, the user 402 may select to send the content though a voice command. In another form of content transmission, the client device 104 operating in accordance with the system application may automatically transmit the content to the communication system server 108 upon expiration of a time period. For example, in the case of content corresponding to a prefixed text message, the client device may transmit the content after 3 seconds, as timed using a top-down counter of the client device.

Upon receipt of the communication content, the communication system server 108 operating in accordance with the system application, notifies one or more client devices 106 that are currently logged into an account of the anonymous communication system that is associated with the motor vehicle identifier, of the incoming content (step 422). These one or more client devices 106 are referred to hereafter as "target" client devices. The target client device 106 operating in accordance with the system application enables an option for the target client device 106 to accept or reject the communication content (step 424). For example, the target client device 106 may present a GUI, e.g., a touch button, on the display of the device that allows the user of the client device to accept or reject the content (step 426). Upon receipt of the accept/reject input, the target client device 106 operating in accordance with the system application, transits the accept/reject outcome to the communication system server 108 (step 428).

If content is rejected at the target client device 106, the communication system server 108 operating in accordance with the system application, sends a message to the client device 104 that the content was rejected (step 430). If the content is accepted at the target client device 106, the communication system server 108 operating in accordance with the system application, transmits the content to the target client device 106 (step 432). The target client device 106 operating in accordance with the system application presents the content (step 434) through one or more audio and/or visual components of the device.

The foregoing describes an example anonymous communication session comprising the creation and transmission of a single piece of communication content. It is understood that an ongoing communication session may involve the exchange of additional pieces of communication content. For example, the target of the initial piece of communication content may create and transmit communication content in response to the initial communication. In an ongoing communication session, most of the processes described in FIGS. 4A and 4B may no longer be necessary, including those related to search for and statuses of the vehicle identifier (steps 410, 412, 414), and acceptance/rejection of content (steps 422, 424, 426, 428, 430), with only those processes directed to content creation and transmission remaining (steps 416, 418, 420, 432, 434). At any time during a communication session, the target client device 106 may transmit a command to the communication system server 108 to terminate an ongoing communication session with the requesting client device 104. Furthermore, the target client device 106 may transmit a command to the communication system server 108 to block any further communication or communication requests originating from the requesting client device 104.

It is further understood that some of the processes presented in FIGS. 4A and 4B may be executed in parallel or in a different order. For example, creation and transmission of content (steps 416, 418, 420) may occur while the communication system server informs a client device 106 of incoming content (steps 422) and receives an accept/reject response from the client device (steps 424, 426, 428). Alternatively, creation and transmission of content (steps 416, 418, 420) may occur after the communication system server informs a client device 106 of incoming content (steps 422, 424, 426), receives an accept/reject response from the client device (steps 424, 426, 428), and relays the response to the client device 104 (step 430). In this alternative, the user 402 may decide not to create any content if the other party 404 does not want to receive it.

While the anonymous communication system—by default—refrains from including any personal information and correspondence information linked to a motor vehicle identifier in any communication content originating from a communication device 104 linked to the motor vehicle identifier, the system may allow for the sharing of such information. To this end, a client device 104 operating in accordance with the system application presents a GUI, e.g., one or more touch buttons, on the display of the device that enables the inclusion of personal information and/or correspondence information in content created at the device. For example, the device may display a message asking the user if she wants to add her name, telephone number, or any other information to the communication. In this case, the communication content transmitted by the user's client device 104 to the communication system server 108 includes an indication, e.g., a data flag, of what elements of personal information the user has opted to include. Based on this indication, the communication system server 108 obtains the information from the database records and adds it in the communication content.

The person of ordinary skill in the art will recognize in view of this disclosure that various additional or alternative steps may lend themselves to the anonymous communication system 100. For example, for purposes of safety, a number of standard prefixed commands, statements, and/or queries may be established on the client-side portion of the application so that such statements, commands or questions may be accessed without the need to text or write while driving. Such commends might include the ability to access a menu of options by touchpad or voice command; dictate short messages using voice recognition software; send a message through voice command or touch command; attach a photo or video to a message through voice command or touch command; decline or accept a request to communicate from a requestor through voice command or touch command; block a given user from further communication through voice command or touch command; end a telephone call, etc.

Having thus described a basic search and communication session provided by the anonymous communication system, further description of some particularly unique and beneficial features enabled by the system follow. For example, while the communication session in FIGS. 4A and 4B assumed that the entered vehicle identifier was registered with the anonymous communication system and active, in some cases the subject vehicle identifier may not be available for immediate communication because it is either unregistered or registered but inactive. To account for these scenarios, a feature of the anonymous communication system enables the creation and storage of communication content for future transmission, referred to herein as "prospective anonymous communication." Another feature enabled by the anonymous communication system, and described further below, allows for the broadcasting of anonymous communication content to a selected audience.

Prospective Anonymous Communication

The prospective anonymous communication feature of the communication system 100 enables future communication when a present communication cannot be facilitated because the vehicle identifier that is the subject of a search query is not registered with the system or is registered but inactive. The method represents a technological solution to a problem that would be encountered by a user of conventional communication systems. For example, conventional communication systems that may provide for anonymous communication based on a motor vehicle identifier (such as described in https://www.popsci.com/cars/article/2010-09/social-networking-site-uses-license-plates-connect-drivers and https://quickblox.com/app/chat/chat-for-car-owners-via-license-plate-app.ios) do not address the scenario where communication with an unregistered motor vehicle identifier is desired.

The present anonymous communication system addresses this need through specific and unconventional configuration of user devices and a communication system server, and unconventional interaction between these components that implement prospective anonymous communication between devices. No existing communication systems or social media platforms allow for this type of communication. Thus, the processes and methods described below with reference to of FIGS. 5A, 5B, 6 and 7 are more than a performance of well-understood, routine, and conventional activities previously known in the industry.

Figure 5A:
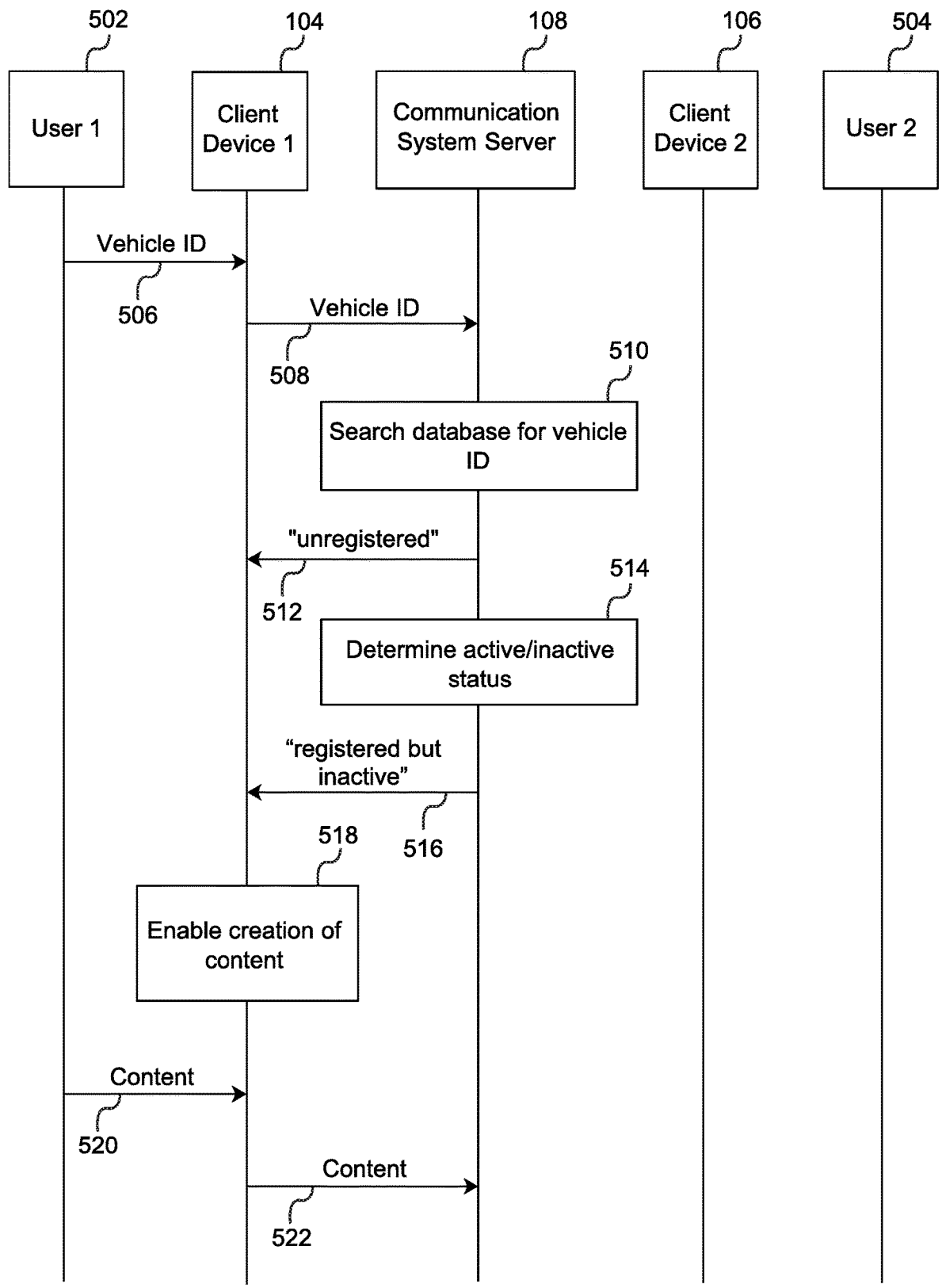
FIGS. 5A and 5B are flow diagrams illustrating the operation of and interaction between various components of the anonymous communication system of FIG. 1 for enabling prospective anonymous communication.
Figure 5B:
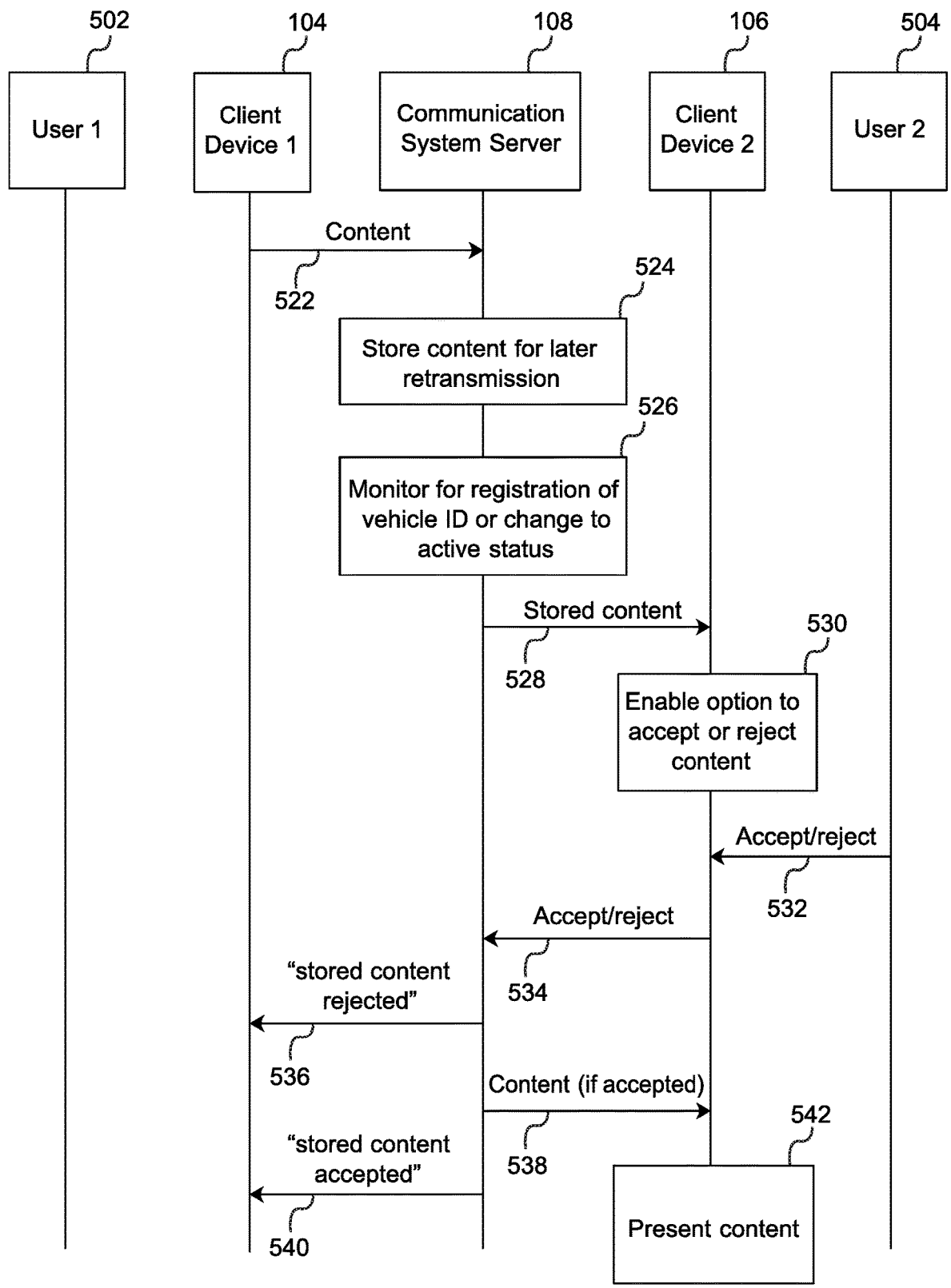

With reference to the flow diagrams of FIGS. 5A and 5B, in an example of prospective anonymous communication, a user 502 who wishes to communicate with another party 504 may access the system application on a client device 104 and request a communication session with the other party 504. To enable this request, a client device 104 operating in accordance with the system application, presents a GUI on the display of the device that allows for the entry of a vehicle identifier (step 506) of the motor vehicle as a search query for the communication system 100. As described above in similar step 406, entry of the vehicle identifier can be performed by any suitable data entry means.

Upon entry of the vehicle identifier, the client device 104 operating in accordance with the system application, presents a GUI, e.g., a touch button, on the display of the client device 104 that enables transmission of the vehicle identifier (step 508) to the communication system server 108. Upon receipt of the vehicle identifier, the communication system server 108 operating in accordance with the system application, searches for the vehicle identifier in its database 110 (step 510).

Assuming the vehicle identifier is not in the database 110, an "unregistered" message is generated by the communication system server 108 and transmitted to the client device 104 (step 512). Upon receipt of this message, the client device 104 operating in accordance with the system application, presents a GUI on the display of the client device 104 indicating that the entered vehicle identifier is not registered with the anonymous communication system. In this case, the process may proceed to step 518, which is described further below.

If, however, the vehicle identifier is in the database 110 (which means that the vehicle identifier is registered with the anonymous communication system) the communication system server 108 determines the status associated with the vehicle identifier (step 514). As previously mentioned, the communication system server 108 determines a registered motor vehicle is "active" when at least one communication device is logged into an account of the anonymous communication system that is associated with the motor vehicle identifier. A registered motor vehicle is considered "inactive" if no communication devices are logged into an account of anonymous communication system that is associated with the motor vehicle identifier.

Upon determining the active/inactive status of the vehicle identifier, a message is generated by the communication system server 108 and transmitted to the client device 104 (step 516). Assuming the communication system server 108 message indicates to the client device 104 that the vehicle identifier that is the subject of the search query is "registered but inactive" (step 516), the client device 104 operating in accordance with the system application presents a GUI on the display of the client device 104 indicating that the vehicle identifier is registered but inactive.

In either case, whether the vehicle identifier is unregistered or is registered but inactive, the client device 104 operating in accordance with the system application may present an additional GUI on the display of the client device 104 that enables the creation of communication content for storage (step 518). Regarding content creation (step 520), the client device 104 operating in accordance with the system application, enables the creation of communication content at the client device 104, as described above in similar step 418. Upon completion of content creation, the client device 104 operating in accordance with the system application, enables the transmission of communication content to communication system server 108 (step 522).

Upon receipt of the communication content, the communication system server 108 stores the content for future retransmission (step 524).

The communication system server 108 operating in accordance with the system application monitors the anonymous communication system 100 for registration of the vehicle identifier or a change in status of the vehicle identifier from inactive to active (step 526). To this end, the communication system server 108 may periodically scan the database 110 records for recently registered motor vehicle identifiers to determine if any match the subject vehicle identifier. Similarly, in the case of a registered but inactive vehicle identifier, the communication system server 108 may periodically check the registered data records of the vehicle identifier to see if the status has changed from inactive to active.

If the vehicle identifier becomes registered or changes to active status, the communication system server 108 operating in accordance with the system application, notifies the target client devices 106 that are currently logged into an account of the anonymous communication system that is associated with the motor vehicle identifier, of the stored content (step 528). The client device 106 operating in accordance with the system application enables an option for the client device 106 to accept or reject the stored content (step 530). For example, the client device 106 may present a GUI, e.g., touch button, on the display of the device that allows the user of the client device to accept or reject the content (step 532). Upon receipt of the accept/reject input, the client device 106 operating in accordance with the system application, transits the accept/reject outcome to communication system server 108 (step 534).

If content is rejected at the client device 106, the communication system server 108 operating in accordance with the system application, sends a message to the client device 104 indicating that the stored content was rejected (step 536). If the stored content is accepted at the client device 106, the communication system server 108 operating in accordance with the system application, transmits the content to the client device 104 (step 538) and notifies the client device 104 that the content was delivered (step 440). The client device 106 operating in accordance with the system application presents the content (step 442).

Figure 6:
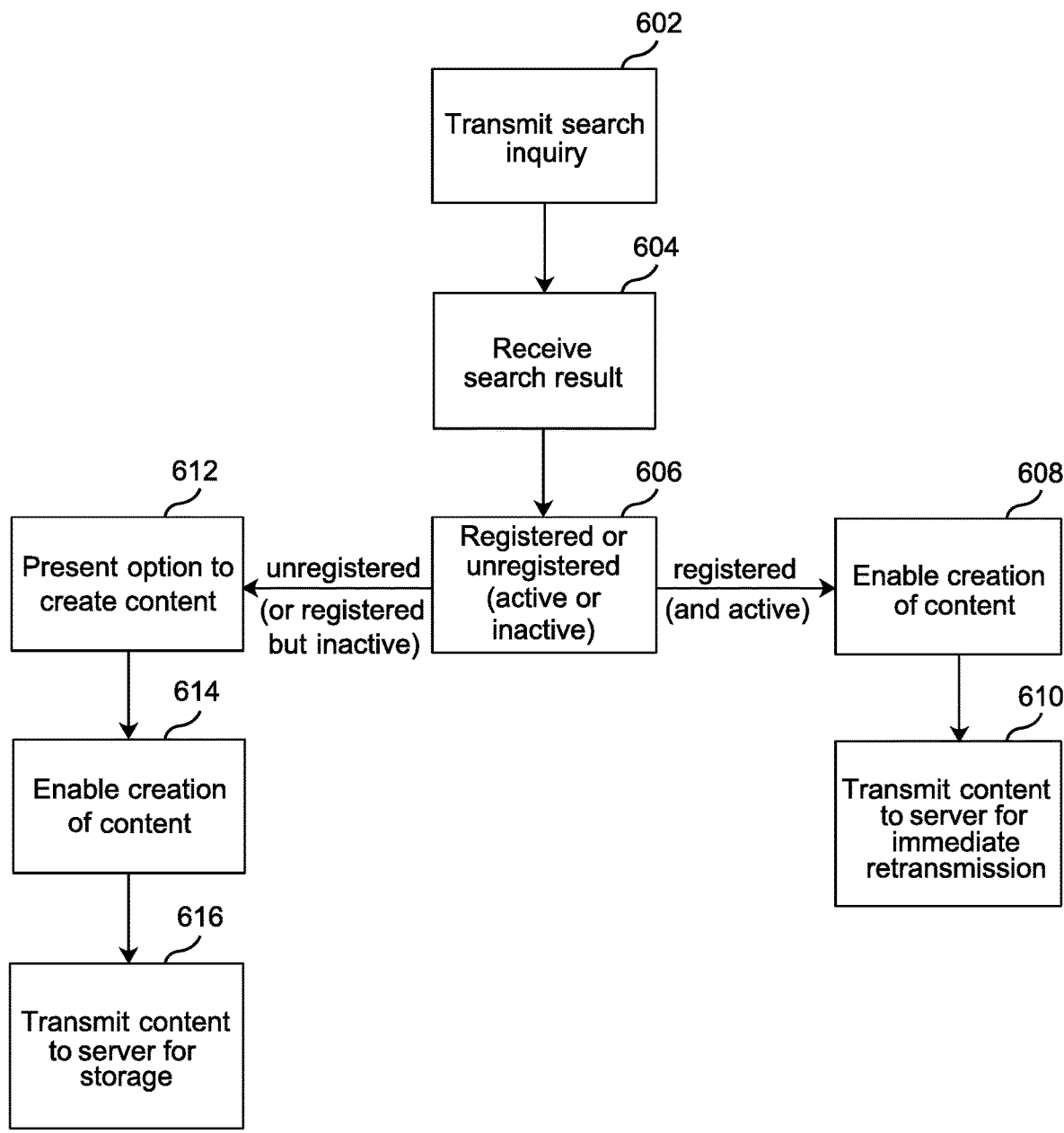
FIG. 6 is flowchart of a method of prospective anonymous communication performed by a client device of FIG. 1.
Figure 7:
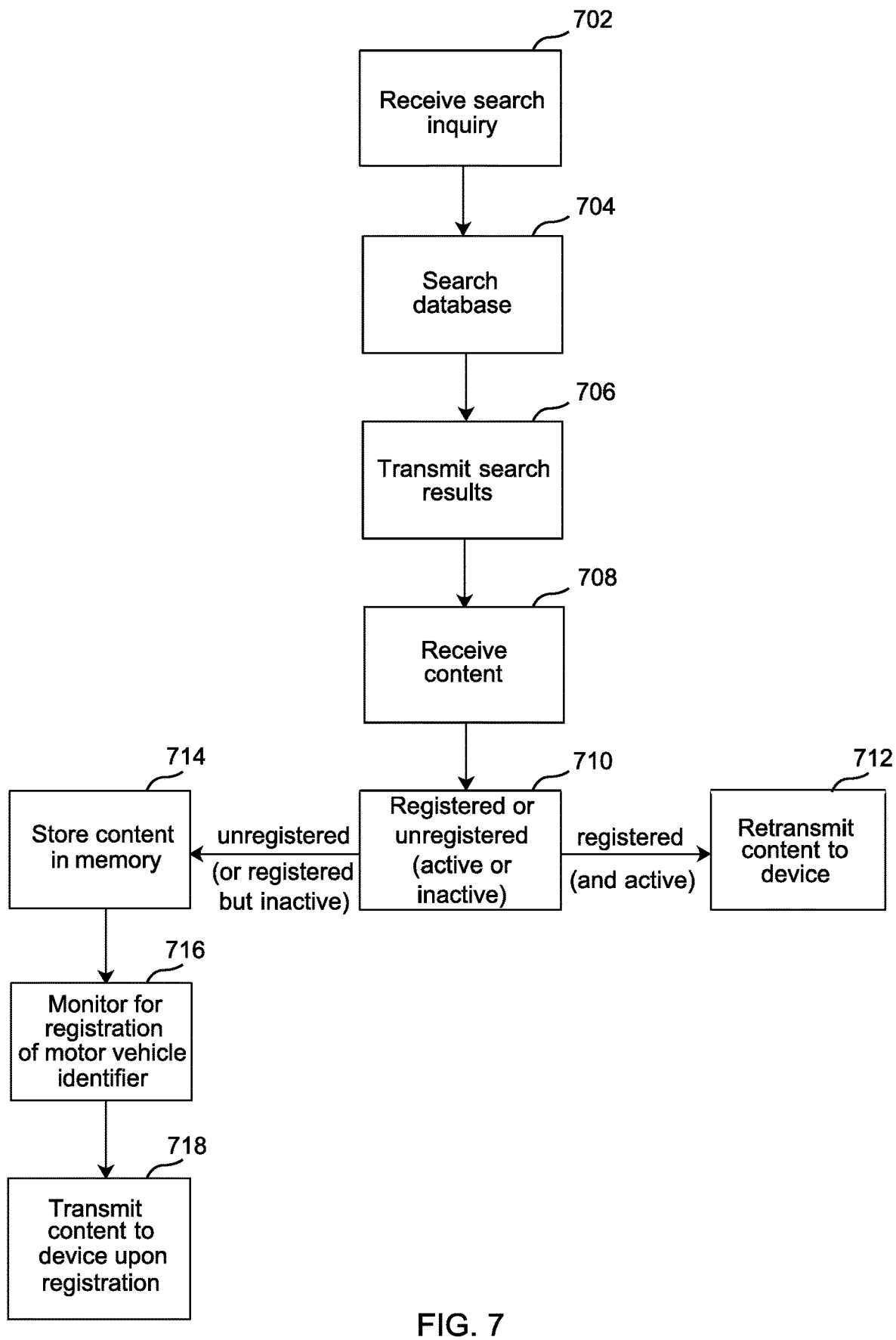
FIG. 7 is flowchart of a method of prospective anonymous communication performed by the communication system server of FIG. 1.

FIGS. 6 and 7 are flowcharts of methods of prospective anonymous communication from the perspective of a client device (FIG. 6) and a server (FIG. 7). With reference to the method of FIG. 6, which may be performed by a client device having a processor that operates in accordance with a system application, at block 602 a search query corresponding to a motor vehicle identifier is transmitted by the client device to a server of an anonymous communication system. The search query may be received by the client device through a user interface of the device. For example, the client device may present through the user interface one or more of a mechanism, e.g., a touch button keyboard, for initiating a text entry of the motor vehicle identifier, a mechanism, e.g., a camera touch button, for initiating a visual capture of the motor vehicle identifier, and a mechanism, e.g., a recording touch button, for initiating an audio capture of the motor vehicle identifier.

At block 604, the client device receives a search result indicating whether the motor vehicle identifier is registered or is not registered with the anonymous communication system. At block 606, the client device proceeds further, in different ways depending on the registration status of the motor vehicle identifier. In cases where the motor vehicle identifier is registered, at block 608, the client device enables the creation of content to be communicated. At block 610, upon completion of content creation, the client device transmits the content to the server for retransmission to a device associated with the registered motor vehicle identifier.

In cases where the motor vehicle identifier is not registered, at block 612, the client device presents through the user interface a mechanism that provides an option to create content even though the motor vehicle identifier is unregistered and thus not available for communication. The mechanism may be in the form of a touch button on the display or a voice inquiry played on the device speaker that asks the user if he wants to create content for potential, future transmission to a communication device associated with the motor vehicle identifier. If the user opts to create content, then at block 614, the client device enables the creation of content to be communicated. At block 616, the client device transmits the content to the server for storage within the anonymous communication system, with the expectation that the content will be retransmitted to a device associated with the motor vehicle identifier if the motor vehicle identifier subsequently becomes registered with the anonymous communication system.

With respect to blocks 608 and 614, the client device enables content creation, for example, by presenting through the user interface one or more of a mechanism, e.g., a touch selection screen, for accessing a plurality of prefixed text messages for selection as the content, a mechanism, e.g., a touch screen keyboard, for initiating a text entry of the content, a mechanism, e.g., a camera touch button, for initiating a visual capture of the content, and a mechanism, e.g., a recording touch button, for initiating an audio capture of the content. If the content corresponds to any one of a text entry, a visual capture or an audio capture, the client device may present through the user interface a mechanism for confirming the content prior to transmitting the content to the server. If the content corresponds to a prefixed text message, the client device may automatically transmit the content upon expiration of a time period, e.g., within 3 seconds, without obtaining confirmation.

In all cases, the content created by the client device is by default, devoid of any information that would enable identification of the user or enable another mode of communication with the user. The client device, may however, prior to transmitting the content to the server, present through the user interface a mechanism for authorizing the server to transmit information of the user together with the retransmission of the content to the device associated with the motor vehicle identifier. For example, the client device may inquire through a display on the user device if the user wants to add her name, telephone number or email address to the content.

With reference to the method of FIG. 7, which may be performed by a communication system server 108 having a processor that operates in accordance with a system application, at block 702, the server receives a search query corresponding to a motor vehicle identifier from a client device 104 registered with an anonymous communication system 100. At block 704, the server 108 searches a database 110 for the motor vehicle identifier to determine whether the motor vehicle identifier is registered or unregistered, and if it is registered, whether it is active or inactive.

At block 706, the server 108 transmits the search result to the client device 104. The search result provides an indication of whether the motor vehicle identifier that was the subject of the search inquiry is registered or unregistered with the anonymous communication system 100. At block 708, the server 108 receives content from the client device 104. The content is by default, devoid of any personal information that would enable identification of the user or correspondence information that would enable another mode of communication with the user.

At block 710, the server 108 proceeds further, in different ways depending on the status of the motor vehicle identifier that was the subject of the search inquiry. In cases where the motor vehicle identifier is registered and active, at block 712, the server 108 retransmits the content to a client device 106 associated with the motor vehicle identifier.

In cases where the motor vehicle identifier is either unregistered or registered but inactive, at block 714, the server 108 stores the content in a memory. At block 716, the server 108 monitors the database 110 for a subsequent change in status of the motor vehicle identifier. For example, if the motor vehicle identifier is unregistered, the server 108 may periodically search the data base records for the motor vehicle identifier to determine if it has become registered. Or, if the motor vehicle identifier is registered but inactive, the server 108 may monitor the anonymous communication system to determine if a communication device has logged into an account of the anonymous communication system that is associated with the motor vehicle identifier. At block 718, if the motor vehicle identifier becomes registered with the anonymous communication system, the server 108 transmits the stored content to a device associated with the motor vehicle identifier.

The prospective anonymous communication features of the communication system 100 thus described represent a technological solution to problems encountered by users of conventional communication systems that do not address the scenario where communication with an unregistered or inactive motor vehicle identifier is desired. The unconventional configuration of user devices and the communication system server of the anonymous communication system, and unconventional interaction between these components allow a user to anonymously communicate with another user in the future.

Broadcast of Anonymous Communication Content

The anonymous broadcast communication feature of the communication system 100 enables the broadcast of anonymous communication content to select communication devices that are associated with a motor vehicle identifier registered with an anonymous communication system. The method represents a technological solution to a problem that would be encountered by a user of conventional communication systems. For example, conventional communication system that may provide for the broadcast of communication to users within a broadcast radius (such as described in https://play.google.com/store/apps/details?id=com.bitmob.app&hl=en, https://www.accengage.com/send-location-based-push-notifications-thanks-to-geolocation-geofencing-and-ibeacons/, http://www.umsalert.com/en/technology/ums-location-based-alerting-system/) do not enable the selection of specific, anonymous individuals for receipt of the broadcast content.

The present anonymous broadcast communication system addresses this need through specific and unconventional configuration of user devices and a communication system server, and unconventional interaction between these components that implement anonymous broadcast communication between devices. No existing communication systems or social media platforms allow for this type of communication. Thus, the processes and methods described below with reference to of FIGS. 8-12 are more than a performance of well-understood, routine, and conventional activities previously known in the industry.

Figure 8:
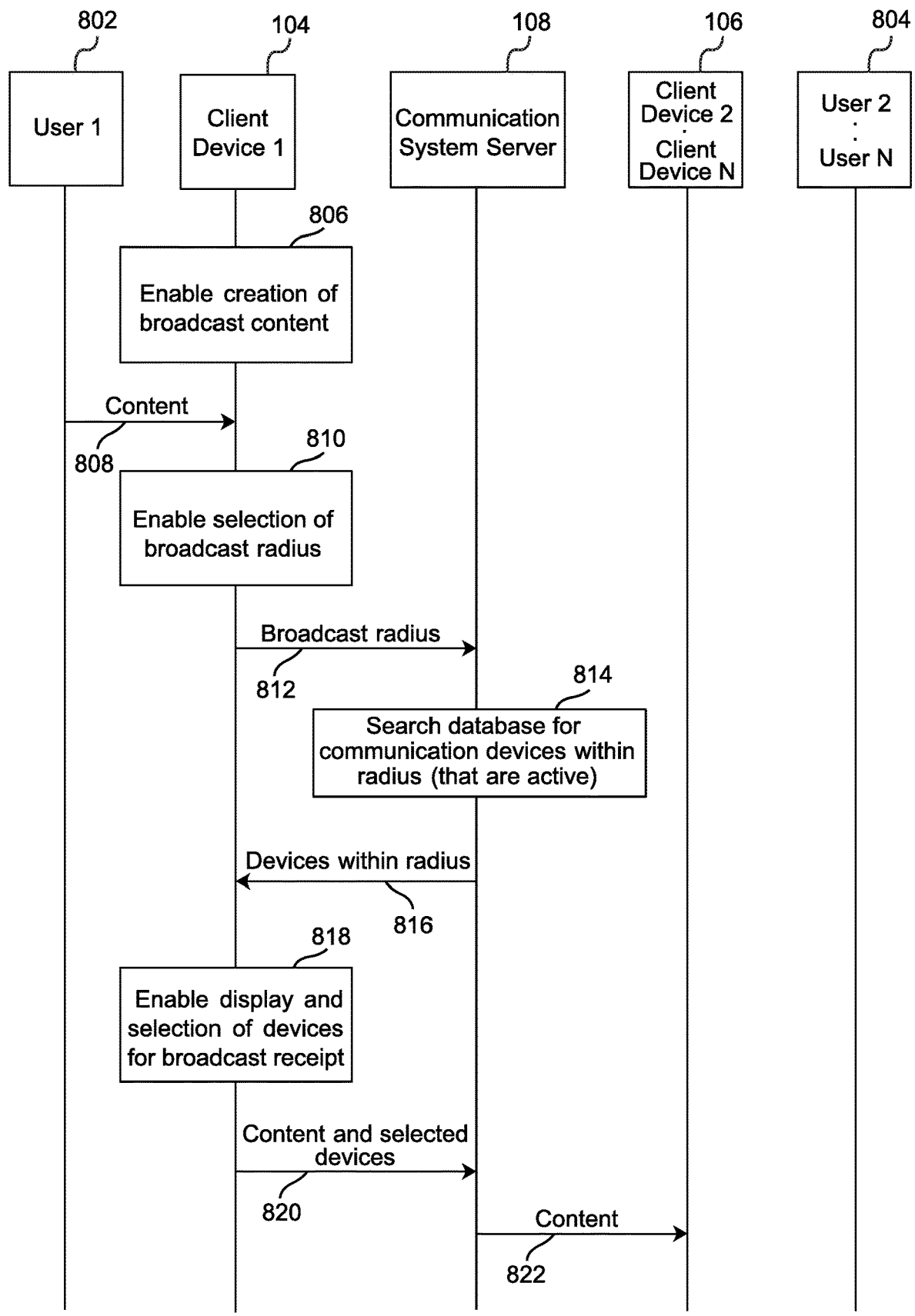
FIG. 8 is a flow diagram illustrating the operation of and interaction between various components of the anonymous communication system of FIG. 1 for enabling a first form of anonymous broadcast communication.

With reference to the flow diagram of FIG. 8, in an example anonymous communication broadcast, a user 802 who wishes to broadcast anonymous communication content to other parties 804 may access the system application on a client device 104 and request a broadcast communication session with the other parties 804. To enable this request, the client device 104 operating in accordance with the system application, presents a GUI on the display of the device that allows for the creation of broadcast content (step 806). Regarding content creation (step 808), the client device 104 operating in accordance with the system application, enables the creation of broadcast content at the client device 104, as described above in similar step 418.

Upon completion of broadcast content creation, the client device 104 operating in accordance with the system application, enables the selection of a broadcast distance, typically in terms of a radius (step 810). To enable this request, the client device 104 operating in accordance with the system application, presents a GUI on the display of the device that allows for the selection of a broadcast radius. Selection may be through a touch button on the display or through a voice command. The broadcast radius may be relative to the current location of the client device 104, or some other geographic reference point.

Upon selection of a broadcast radius, the client device 104 operating in accordance with the system application, enables transmission of the broadcast radius (step 812) to the communication system server 108. Upon receipt of the broadcast radius, the communication system server 108 operating in accordance with the system application, searches for target client devices 106 that are logged into an account of the anonymous communication system and that are within the broadcast radius (step 814). To this end, the anonymous communication system 100 tracks the geographic location of logged in devices using for example, the GPS capabilities of the client devices 106, and stores the locations in the database 110. The communication system server 108 scans the database records for logged in devices within the selected radius.

Upon locating the logged in client devices 106 that are within the broadcast radius, information corresponding to the located client devices is collected by the communication system server 108 and transmitted to the client device 104 (step 816). The type and amount of information for a located client device that is transmitted by the communication system server 108 is determined based on the settings of anonymous communication system that the located client device 106 is logged into. These settings are defined by the anonymous communication system account owner and may be set to preserve the anonymity of the user of the device or the account owner. For example, the account settings may only allow for the user name or vehicle identifier to be included in the information. Alternatively, the setting may allow for the inclusion of personal information (e.g., name) or correspondence information (e.g., e-mail address) or additional vehicle information (e.g., make, model, color).

Upon receipt of the client device information, the client device 104 operating in accordance with the system application, presents a GUI on the display of the device that displays information on the located client devices 106 (step 818). The information may be presented in distance order, from closest to furthest in terms of radius. The GUI also allows for the selection of located client devices that are to receive the broadcast content (step 818). The selection may be made, for example, through touch screen buttons positioned alongside the displayed information of the located client devices.

Upon completion of the selection of broadcast target devices 106, the client device 104 operating in accordance with the system application, enables transmission of the broadcast content created at step 806 and information that identifies the broadcast target devices 106 (step 820) to the communication system server 108. This information may include, for example, the motor vehicle identifier with which the target client device 106 is associated. Upon receipt of this information and content, the communication system server 108 operating in accordance with the system application transmits the content to the selected target client devices 106 (step 822).

The foregoing describes an example anonymous broadcast session comprising the creation and transmission of a single piece of broadcast content. It is understood that an ongoing broadcast may involve the broadcast of additional pieces of content. In an ongoing broadcast session, some of the processes described in FIG. 8 may no longer be necessary, including those related to the selection of a broadcast radius (steps 810, 812), and selection of broadcast target devices (step 818). Other process may, however, be involved in a continuing broadcast session. For example, the client devices 106 may come in and out of the broadcast radius. Accordingly, the communication system server 108 may continuously monitor the locations of client devices relative to the radius and autonomously stop sending broadcast content to client devices that fall out of the radius. With respect to client device coming into the broadcast radius, the communication system server 108 may send updated information to the broadcasting client device 104 indicating new client devices are available for selection as broadcast target devices by the broadcasting client device.

At any time during a broadcast session, a broadcast target device 106 may transmit a command to the communication system server 108 to terminate its reception of further broadcast content from the broadcasting device 104. Furthermore, the broadcast target device 106 may transmit a command to the communication system server 108 to block any further broadcasts or other communication requests originating from the broadcasting device 104. It is further understood, that some of the processes presented in FIG. 8 may be executed in parallel or in a different order. For example, selection of broadcast radius and broadcast target devices (steps 810, 812, 814, 816, 818) may occur prior to the creation of broadcast content (steps 806, 808).

Figure 9:
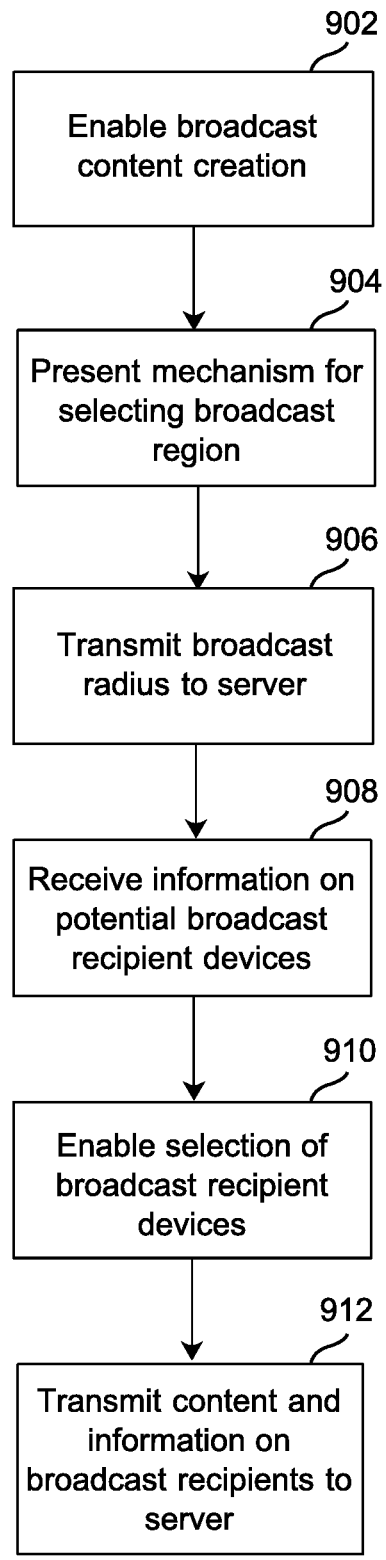
FIG. 9 is flowchart of a method of anonymous broadcast communication performed by a client device of FIG. 1.

FIG. 9 is a flowchart of a method for facilitating anonymous broadcast communication among client devices 104, 106 that are associated with a motor vehicle identifier registered with an anonymous communication system. The method may be performed by a client device 104, referred to below as a broadcasting client device, having a user interface and a processor that operates in accordance with a system application.

At block 902, the broadcasting client device 104 enables through the user interface, creation of content to be broadcast. The client device 104 enables content creation, for example, by presenting through the user interface one or more of a mechanism for accessing a plurality of prefixed text messages for selection as the content, a mechanism for initiating a text entry of the content, a mechanism for initiating a visual capture of the content, and a mechanism for initiating an audio capture of the content. Regarding content creation, the client device 104 operating in accordance with the system application, enables the creation of broadcast content at the client device 104, as described above in similar blocks 608/614.

In all cases, the content created by the client device is by default, devoid of any information that would enable identification of the user or enable another mode of communication with the user. The client device, may however, prior to transmitting the content to the server (later in the method at block 912), present through the user interface a mechanism for authorizing the server to transmit information of the user together with the retransmission of the content to the device associated with the motor vehicle identifier. For example, the client device may inquire through a display on the user device if the user wants to add her name, telephone number or email address to the content.

At block 904, the broadcasting client device 104 presents through the user interface, a mechanism for selecting a broadcast region. The client device 104 may present through the user interface one or more of a mechanism for accessing a plurality of prefixed radiuses that define the broadcast region relative to the client device, a mechanism for initiating a text entry of a broadcast radius, or a mechanism for initiating an audio capture of the broadcast radius. The mechanism may be in the form of a touch button on the display or a voice inquiry played on the device speaker.

At block 906, the broadcasting client device 104 transmits the selected broadcast radius to a server. At block 908, the broadcasting client device 104 receives from the server, information for each logged in client device 106 within the selected radius. The client devices 106 are referred to as potential broadcast target devices.

At block 910, the broadcasting client device 104 enables the selection of broadcast target devices. To this end, the broadcasting client device 104 presents through the user interface, the received information for each potential broadcast target device 106 together with a mechanism for selecting one or more of the devices for reception of the broadcast content. At block 912, the broadcasting client device 104 transmits the broadcast content to the server, together with an indication of the selected devices.

Figure 10:
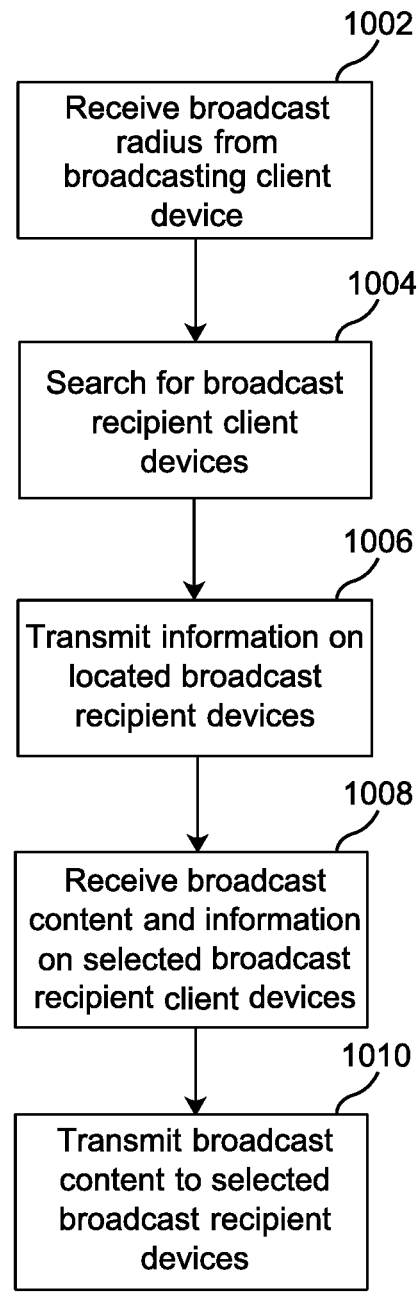
FIG. 10 is flowchart of a method of anonymous broadcast communication performed by the communication system server of FIG. 1.

FIG. 10 is a flowchart of a method for facilitating anonymous broadcast communication among a broadcasting client device 104 and one or more broadcast target devices 106 that are associated with a motor vehicle identifier registered with an anonymous communication system 100. The method may be performed by a communication system server 108 having a processor that operates in accordance with a system application.

At block 1002, the communication system server 108 receives a selected broadcast radius from the broadcasting client device 104. At block 1004, the server 108 searches the database 110 for broadcast target devices 106 within the selected broadcast radius.

At block 1006, the communication system server 108 transmits information for each located broadcast target device 106 to the broadcasting client device 104. At block 1008, the server receives broadcast content from the device, together with an indication of the selected devices, wherein the broadcast content is by default, devoid of any information that would enable identification of the user or enable another mode of communication with the user. At block 1010, the server 108 transmits the broadcast content to the selected target devices 106.

Figure 11:
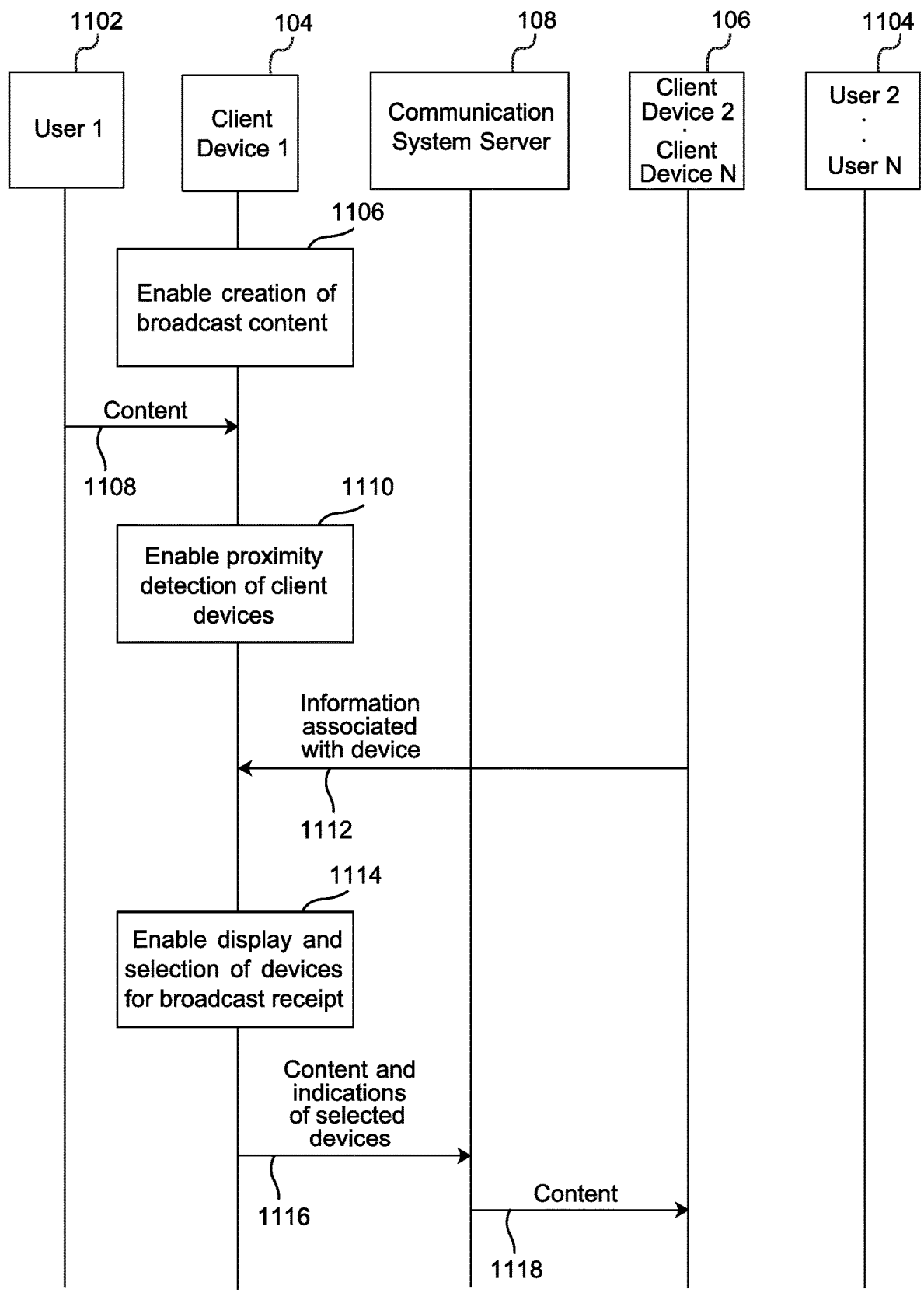
FIG. 11 is a flow diagram illustrating the operation of and interaction between various components of the anonymous communication system of FIG. 1 for enabling an alternate form of anonymous broadcast communication.

With reference to the flow diagram of FIG. 11, in another example anonymous communication broadcast, a user 1102 who wishes to broadcast anonymous communication content to other parties 1104 may access the system application on a client device 104 and request a broadcast communication session with the other parties 1104. To enable this request, the client device 104 operating in accordance with the system application, presents a GUI on the display of the device that allows for the creation of broadcast content (step 1106). Regarding content creation (step 1108), the client device 104 operating in accordance with the system application, enables the creation of broadcast content at the client device 104, as described above in similar step 418.

Upon completion of broadcast content creation, the client device 104 operating in accordance with the system application, enables proximity detection of client devices (step 1110) that are currently logged into an account of the anonymous communication system. To enable this, the client device 104 operating in accordance with the system application, transmits a proximity signal using a peer-to-peer communication protocol, such as Bluetooth, through a network interface of the device and waits for a response from surrounding devices that are both of: 1) associated with a motor vehicle identifier that is registered with the anonymous communication system, and 2) within range of the proximity signal. The range may be, for example, 100 feet.

Information associated with the surrounding responding client devices is included in the responses (step 1112). The information may correspond to one or more pieces of vehicle information or user information that are included in the account records of the anonymous communication system that the device is logged into. The type and amount of information provided in the responses may be determined based on the setting of the anonymous communication system account.

Upon receipt of the information, the client device 104 operating in accordance with the system application, presents a GUI on the display of the device that displays information on the detected client devices 106 (step 1114). The information may be presented in distance order, from closest to furthest in terms of radius. The GUI also allows for the selection of responding client devices that are to receive the broadcast content (step 1114), herein after referred to as broadcast target devices. The selection may be made, for example, through touch screen buttons positioned alongside the displayed information of the responding client devices.

Upon completion of the selection of broadcast target devices, the broadcasting client device 104 operating in accordance with the system application, enables transmission of the broadcast content created at step 1106 together with an indication of the selected broadcast target devices (step 1116) to the communication system server 108. Upon receipt of this information and content, the communication system server 108 operating in accordance with the system application, transmits the content to the broadcast target devices (step 1118).

Figure 12:
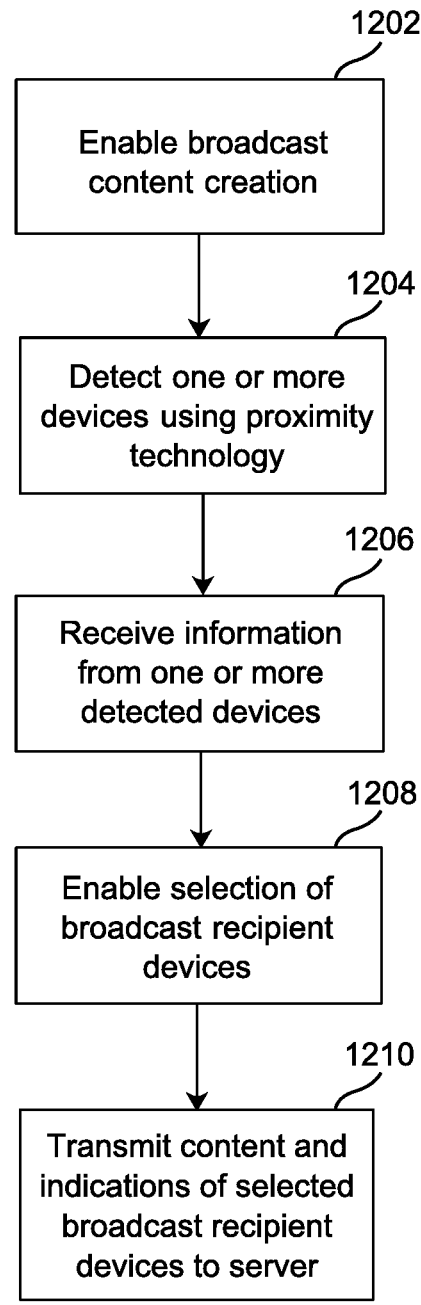
FIG. 12 is flowchart of a method of anonymous broadcast communication performed by a client device of FIG. 1.

FIG. 12 is a flowchart of a method for facilitating anonymous broadcast communication among client devices 104, 106 that are associated with a motor vehicle identifier registered with an anonymous communication system. The method may be performed by a client device 104, referred to below as a broadcasting client device, having a user interface and a processor that operates in accordance with a system application.

At block 1202, the broadcasting client device 104 enables through the user interface, creation of content to be broadcast. The client device 104 enables content creation, for example, by presenting through the user interface one or more of a mechanism for accessing a plurality of prefixed text messages for selection as the content, a mechanism for initiating a text entry of the content, a mechanism for initiating a visual capture of the content, and a mechanism for initiating an audio capture of the content. Regarding content creation, the client device 104 operating in accordance with the system application, enables the creation of broadcast content at the client device 104, as described above in similar blocks 608/614.

At block 1204, the broadcasting client device 104 detects one or more devices using proximity technology, such as Bluetooth as described above with reference to FIG. 11. The detected client devices 106 are devices that are currently logged into an account of the anonymous communication system and are referred to as potential broadcast target devices. At block 1206, the broadcasting client device 104 receives information for each potential broadcast target device 106. The information may correspond to one or more pieces of vehicle information or user information that are included in the account records of the anonymous communication system that the device is logged into.

At block 1208, the broadcasting client device 104 enables the selection of broadcast target devices. To this end, the broadcasting client device 104 presents through the user interface, the received information for each potential broadcast target device 106 together with a mechanism for selecting one or more of the devices for reception of the broadcast content. At block 1210, the broadcasting client device 104 transmits the broadcast content to the server, together with an indication of the selected broadcast target devices.

The anonymous broadcast communication features of the communication system 100 thus described represent a technological solution to problems encountered by users of conventional communication systems that do not enable the selection of specific, anonymous individuals for receipt of broadcast content. The unconventional configuration of user devices and communication system server of the anonymous communication system, and unconventional interaction between these components allow a user to individually select broadcast target devices.

Proximity Anonymous Communication

Figure 13:
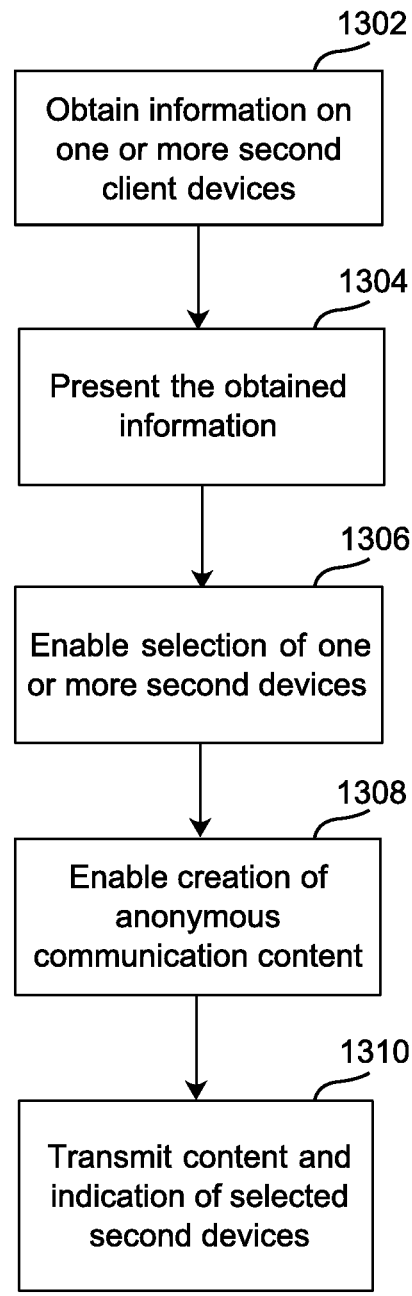
FIG. 13 is a flowchart of a method of proximity anonymous communication performed by a client device of FIG. 1.

FIG. 13 is a flowchart of a method of proximity anonymous communication. The method may be performed by a first client device 104 having a user interface, a network interface and a processor coupled to the user interface and the network interface. The processor, operating in accordance with application instructions stored in a computer-readable medium, enables the first client device 104 to engage in anonymous communication with other, second client devices 106 within proximity of the first client device, while the first client device is logged into an account of an anonymous communication system.

At block 1302, the first client device 104 operating in accordance with application instructions, obtains information on one or more second client devices 106 that are both of: 1) logged into an account of the anonymous communication system, and 2) within a predetermined distance of the first client device. At block 1304, the first client device 104 operating in accordance with application instructions, presents, through its user interface, the obtained information on each of the one or more second client devices 106.

At block 1306, the first client device operating in accordance with application instructions, enables through its user interface, selection of one or more second devices for receipt of anonymous communication content. At block 1308, the first client device 104 operating in accordance with application instructions, enables creation of anonymous communication content through its user interface. The anonymous communication content is by default, devoid of any information that would enable identification of the user of the communication device or enable another mode of communication with the user.

At block 1310, the first client device 104 operating in accordance with application instructions, transmits through its network interface, the content to a server 108 of the anonymous communication system, together with an indication of the one or more selected second client devices 106.

Motor Vehicle Location

In another embodiment, a communication device 104 is configured to store a location of a motor vehicle 118 having a vehicle network interface and a motor vehicle identifier that is registered with an anonymous communication system. The communication device 104 includes a user interface, a device network interface configured to detect, pair with, and connect with one or more vehicle network interfaces, and a processor coupled to the user interface and the device network interface. The device network interface and vehicle network interface may be, for example, interfaces that operate in accordance with Bluetooth technology standards.

The processor, operating in accordance with application instructions stored in a computer-readable medium, enables the communication device 104 to store a location of a motor vehicle 118 while the communication device is logged into an account of an anonymous communication system 100. To this end, the communication device 104 detects when the device network interface connects with the vehicle network interface of the motor vehicle 118. "Connects" in accordance with Bluetooth technology means that the communication device 104 and vehicle network interface have been previously paired.

After detection of a connection between the device network interface and the vehicle network interface, the communication device 104 detects a continuous disconnection when the device network interface is continuously disconnected from the vehicle network interface for a predetermined period. The period may be, for example, 8 seconds. Upon detection of a continuous disconnection, the communication device 104 transmits an indication of the detection of the continuous disconnection to a server 108 of the anonymous communication system 100. The communication device 104 then receives from the server 108, information corresponding to the location of the motor vehicle 118, and presents, through the user interface, the information together with a mechanism for storing the information on the device. The location information may correspond to GPS coordinates and the communication device 104 may present the information on the user interface in the form of a map with the GPS coordinates showing the location of the motor vehicle. The mechanism for storing the location information may be in the form of one or more touch buttons that enables the user to either store the location or ignore/delete the location information.

Continuing with Bluetooth technology, in cases where the device network interface of the communication device 104 merely "detects" the vehicle network interface but cannot "connect" with the vehicle network interface because it has not been previously "paired" with the vehicle network interface, the processor, operating in accordance with application instructions stored in a computer-readable medium, enables the communication device 104 to present, through the user interface, an mechanism for the pairing with the vehicle network interface. The mechanism for pairing may be in the form of a touch button that enables pairing between the device network interface and the vehicle network interface. Once the network interfaces are paired, the interfaces may connect, and storage of motor vehicle location may proceed as described above.

Figure 14:
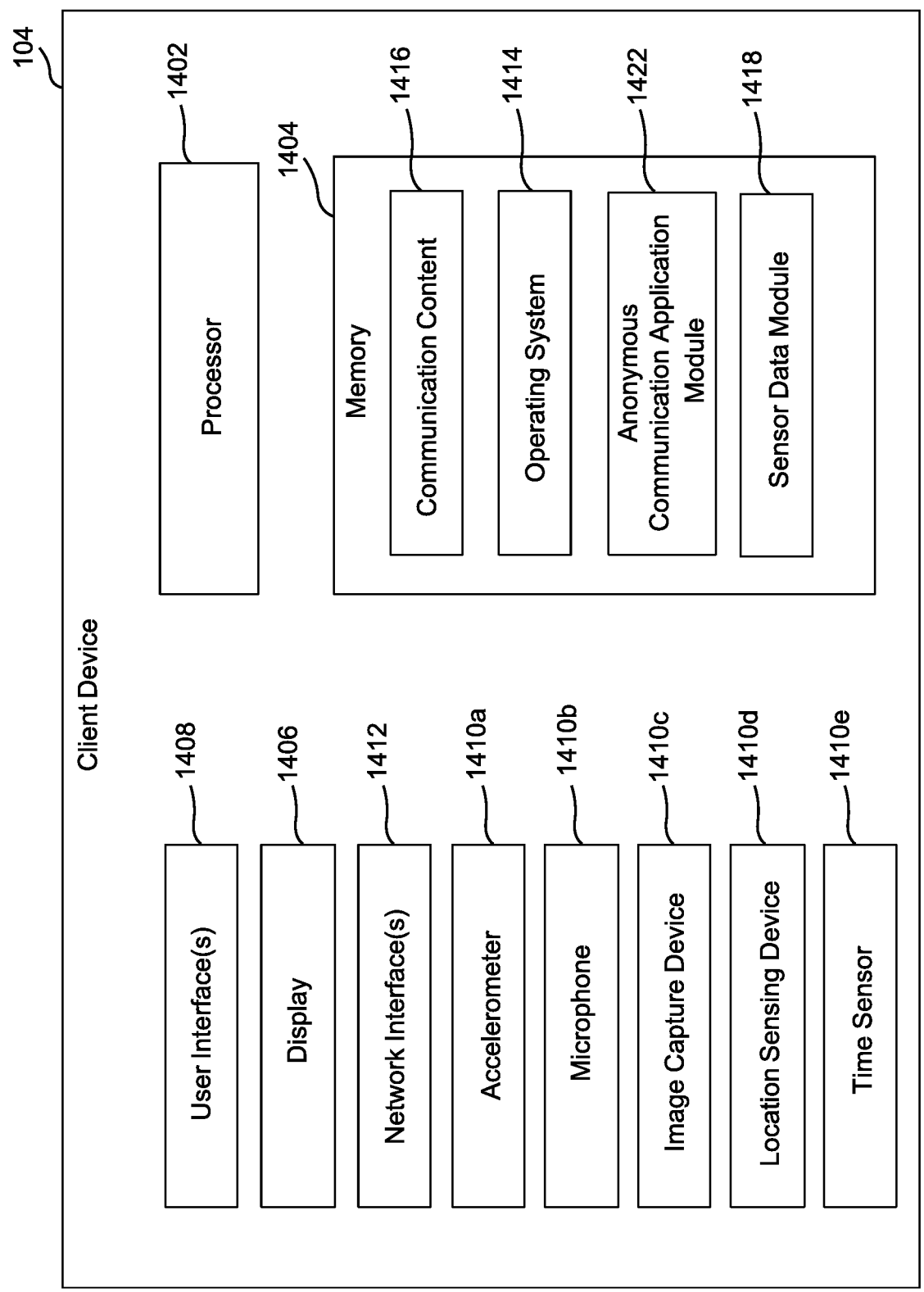
FIG. 14 is a block diagram of a client device configured to enable prospective anonymous communication and anonymous broadcast communication.

FIG. 14 is a schematic block diagram of a client device 104 configured to enable the anonymous communication functionalities describe above with reference to FIGS. 1-12. In certain embodiments, the client device 104 may be implemented or embodied as a mobile telephone, a vehicle on-board computer, a desktop computer, a laptop computer, a tablet computer or any smart device.

The client device 104 may include one or more processors 1402 configured to access and execute computer-executable instructions stored in at least one memory 1404. The processor 1402 may be implemented as appropriate in hardware, software, firmware, or combinations thereof. Software or firmware implementations of the processor 1402 may include computer-executable or machine-executable instructions written in any suitable programming language to perform the various functions described herein. The processor 1402 may include, without limitation, a central processing unit (CPU), a digital signal processor (DSP), a reduced instruction set computer (RISC) processor, a complex instruction set computer (CISC) processor, a microprocessor, a microcontroller, a field programmable gate array (FPGA), a System-on-a-Chip (SOC), or any combination thereof. The client device 104 may also include a chipset (not shown) for controlling communications between the processor 1402 and one or more of the other components of the client device 104. The processor 1402 may also include one or more application-specific integrated circuits (ASICs) or application-specific standard products (ASSPs) for handling specific data processing functions or tasks.

The memory 1404 may include, but is not limited to, random access memory (RAM), flash RAM, magnetic media storage, optical media storage, and so forth. The memory 1404 may include volatile memory configured to store information when supplied with power and/or non-volatile memory configured to store information even when not supplied with power. The memory 1404 may store various program modules, application programs, and so forth that may include computer-executable instructions that upon execution by the processor 1402 may cause various operations to be performed. The memory 1404 may further store a variety of data manipulated and/or generated during execution of computer-executable instructions by the processor 1402.

The client device 104 may further include one or more user interfaces 1408 that may facilitate interaction between a user and the client device 104 using one or more I/O devices. The I/O devices may include, but are not limited to, a remote control, a display, a keypad, a mouse, a pointing device, a control panel, a touch screen display, a microphone, a speaker, and so forth. More specifically, the user interfaces 1408 may include hardware, firmware, and/or software for receiving input from a user and providing output to a user via one or more I/O devices.

The user interfaces 1408 may support one or more display devices 1406 configured to render and output information to a user. The client device 104 may further include one or more network interfaces 1412 that may facilitate communication between the client device 104 and one or more other client devices or systems or system components via the anonymous communication system 100 using any suitable communications standard including any of those previously described. For example, a LAN interface may implement protocols and/or algorithms that comply with various communication standards of the Institute of Electrical and Electronics Engineers (IEEE), such as IEEE 802.11, while a cellular network interface implement protocols and/or algorithms that comply with various communication standards of the Third Generation Partnership Project (3GPP) and 3GPP2, such as 3G and 4G (Long Term Evolution), and of the Next Generation Mobile Networks (NGMN) Alliance, such as 5G.

The client device 104 may additionally include one or more sensors 1410a-1410e (generically referred to herein as sensors 1410) that capture data associated with one or more sensed parameters. The sensors 1410 may include, but are not limited to, an accelerometer 1410a, a microphone 1410b, a still or moving image capturing device 1410c, a location sensing device 1410d, a time sensor 1410e, and so forth. While the sensors 1410 are depicted as being provided internally to the client device 104, in certain embodiments, one or more components of the sensors 1410 may be provided externally to the client device 104.

The accelerometer 1410a may be implemented as appropriate in hardware, software, firmware, or combinations thereof. Software or firmware implementations of the accelerometer 1410a may include computer-executable or machine-executable instructions written in any suitable programming language to perform the various functions described herein. The accelerometer 1410a may sense and measure acceleration of either the client device 104 or a vehicle or other device associated with the client device 104. In certain embodiments, the accelerometer 1410a may be configured to sense acceleration along multiple axes. The accelerometer 1410a may be configured to sense changes in acceleration as well.

The microphone 1410b may be provided either internally to or externally from the client device 104 and may be configured to receive audio as input and provide audio output. In certain embodiments, input received via the microphone 1410b may be used to generate at least a portion of communication content 1416. The still or moving image capturing device 1410c may be provided internally to or externally from the client device 104 and may be configured to capture, for example, images and video associated with various routes. Data captured by the image capturing device 1410c may be used, at least in part, to generate communication content 1416.

The location sensing device 1410d may include, but is not limited to, a global positioning system (GPS) receiver, radio receiver, satellite positioning and triangulation module, and so forth. The location sensing device 1410*d* may receive data indicative of a position of the client device 104. In certain embodiments, a GPS receiver may track a current position of the client device 104 according to any suitable schedule (e.g., at predetermined intervals). The location sensing device 1410*d* may output a data file or a log that may identify a respective position of the client device 104 over time. The output may include latitude and/or longitude coordinates, GPS positioning coordinates, or other coordinates that identify the location of the client device 104. The position tracking data captured by the location sensing device 1410*d* may be provided to the server 108. The time sensor 1410*e* may be an internal clock capable of determining time.

The memory 1404 may store various program modules, application programs, and so forth that may include computer-executable instructions that upon execution by the processor 1402 may cause various operations to be performed. For example, the memory 1404 may include an operating system module (O/S) 1414 that may be configured to manage hardware resources such as the user interfaces 1408 and/or the network interface 1412 and provide various services to applications executing on the client device 104.

The memory 1404 may further store additional program modules such as a sensor data module 1418 and anonymous communication application client module 1422 which supports and enables the anonymous communication functionalities described above with reference to FIGS. 1-13.

The sensor data module 1418 may include computer-executable instructions that when executed by the processor 1402 configures the processor 1402 to receive sensor data from the various sensors 1410 to create communication content and determine device location. The location sensing device 1410*d* may, for example, sample the location of a vehicle at predetermined intervals and provide that information to the communication system server 108 for use in locating potential broadcast target devices. For example, the sensor data module 1418 may store location information provided by the location sensing device, which location information may be used to support the anonymous broadcast and proximity communication functions of the anonymous communication system.

In various embodiments, anonymous communication application client module 1422 may also loaded into the memory 1404 and may include computer-executable instructions that when executed by the processor 1402 cause various operations to be performed. For example, the anonymous communication application client module 1422 may be configured to render a user interface on the client device 104 via which a user associated with the client device 104 may interact with an anonymous communication application that may be hosted by the server 108. The user may utilize the anonymous communication application client module 1422 to enable anonymous communication via the associated user interface. In certain embodiments, the anonymous communication application client module 1422 may represent a client-side portion of an anonymous communication application hosted by the communication system server 108.

Figure 15:
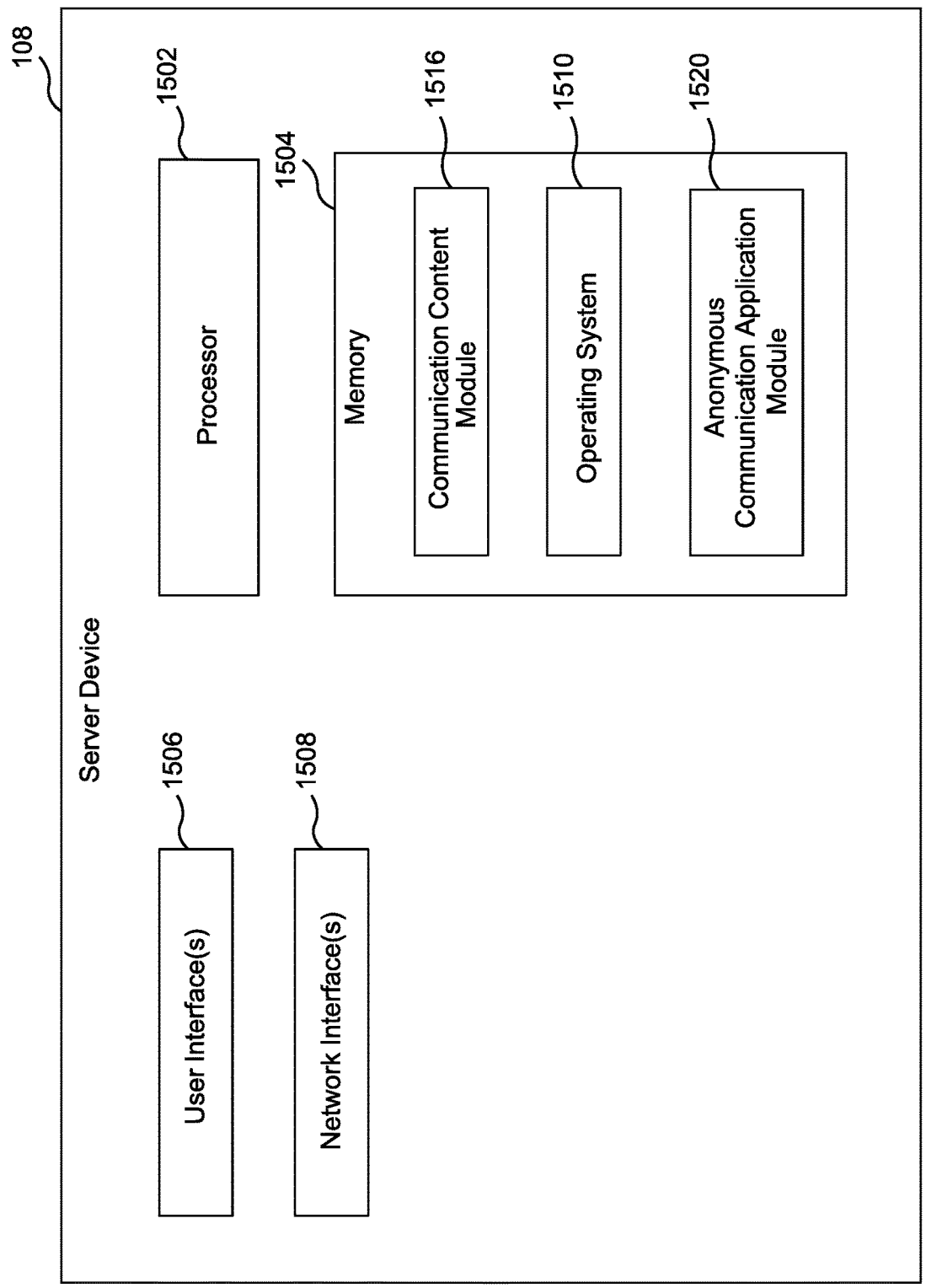
FIG. 15 is a block diagram of a client device configured to enable prospective anonymous communication and anonymous broadcast communication.

FIG. 15 illustrates a schematic block diagram of an illustrative configuration of the communication system server 108 configured to enable the anonymous communication functionalities describe above with reference to FIGS. 1-12. The communication system server 108 may be embodied in any number of processor-driven devices, including, but not limited to, a server computer, a personal computer, one or more networked computing devices, an application-specific circuit, a minicomputer, a microcontroller, and/or any other processor-based device and/or combination of devices.

The communication system server 108 may include one or more processors 1502 configured to access and execute computer-executable instructions stored in at least one memory 1504. The processor 1502 may be implemented as appropriate in hardware, software, firmware, or combinations thereof. Software or firmware implementations of the processor 1502 may include computer-executable or machine-executable instructions written in any suitable programming language to perform the various functions described herein. The processor 1502 may include, but are not limited to, a central processing unit (CPU), a digital signal processor (DSP), a reduced instruction set computer (RISC) processor, a complex instruction set computer (CISC) processor, a microprocessor, a microcontroller, a field programmable gate array (FPGA), a System-on-a-Chip (SOC), or any combination thereof. The server 108 may also include a chipset (not shown) for controlling communications between the processor 1502 and one or more other components of the server 108. The processor 1502 may also include one or more application-specific integrated circuits (ASICs) or application-specific standard products (ASSPs) for handling specific data processing functions, tasks, and execution of machine-readable code.

The memory 1504 may include, but is not limited to, random access memory (RAM), flash RAM, magnetic media storage, optical media storage, and so forth. The memory 1504 may include volatile memory configured to store information when supplied with power and/or non-volatile memory configured to store information even when not supplied with power. The memory 1504 may store various program modules, application programs, and so forth that may include computer-executable instructions that upon execution by the processor 1502 may cause various operations to be performed. The memory 1504 may further store a variety of data manipulated and/or generated during execution of computer-executable instructions by the processor 1502.

The server 108 may further include one or more user interfaces 1506 that may facilitate interaction between a user and the server 108 using one or more I/O devices. The I/O devices may include, but are not limited to, a remote control, a display, a keypad, a mouse, a pointing device, a control panel, a touch screen display, a microphone, a speaker, and so forth. More specifically, the user interface 1506 may include hardware, firmware, and/or software for receiving input from a user and providing output to a user via one or more I/O devices. The user interfaces 1506 may also be configured to facilitate receipt of input provided to peripheral devices or external sensor devices such as a GPS receiver, or a vehicle computing system.

The server 108 may further include one or more network interfaces 1508 that may facilitate communication between the server and one or more other systems or system components via the anonymous communication system 100 using any suitable communications standard including any of those previously described. For example, a LAN interface may implement protocols and/or algorithms that comply with various communication standards of the Institute of Electrical and Electronics Engineers (IEEE), such as IEEE 802.11, while a cellular network interface implement protocols and/or algorithms that comply with various communication standards of the Third Generation Partnership Project (3GPP) and 3GPP2, such as 3G and 4G (Long Term Evolution), and of the Next Generation Mobile Networks (NGMN) Alliance, such as 5G.

Continuing with the memory 1504, an operating system (O/S) 1510 may be loaded therein that may be configured to manage hardware, software and/or firmware resources and provide various services to applications executing on the server 108. The memory 1504 may further include various program modules such as an anonymous communication application server module 1520. The anonymous communication application server module 1520 may include computer-executable instructions that when executed by the processor 1502 supports and enables the anonymous communication functionalities described above with reference to FIGS. 1-13. In various embodiments, the anonymous communication application server module 1520 may be a server-side portion of a distributed application configured to interface with the client-side anonymous communication module 1142. In various embodiments, the server 108 may host the anonymous communication application server module 1520. The memory 1504 also includes a communication content module 1516 that receives and processes the communication content receives from client device 104.

One of ordinary skill in the art will also understand that the client device of FIG. 14 and the server of FIG. 15 may include alternative and/or additional features without deviating from the scope of the present disclosure. In accordance with various aspects of the present disclosure, an element, or any portion of an element, or any combination of elements may be implemented with one or more processors. Examples of the one or more processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The client device and server may be implemented with a bus architecture that includes any number of interconnecting buses and bridges. The bus may link together various circuits including the one or more processors, the memory, and any computer-readable media encompassed by the memory. The bus may also link various other circuits such as timing sources, peripherals, voltage regulators, and power management circuits, which are well known in the art.

The one or more processors may be responsible for managing the bus and general processing, including the execution of software stored on the computer-readable medium. The software, when executed by the one or more processors, causes the processing system to perform the various functions described above for any one or more apparatuses. The memory may also be used for storing data that is manipulated by the one or more processors when executing software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside in the memory on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A device for facilitating anonymous communication by a user of the device with one or more other devices, each device associated with a motor vehicle identifier registered with an anonymous communication system, the device comprising:
   a user interface;
   a network interface; and
   a processor coupled to the user interface and the network interface, and operating in accordance with application instructions stored in a computer-readable medium, the processor configured to enable the device to:
   transmit a search query to a server, the search query corresponding to a motor vehicle identifier,
   receive from the server, an indication that the motor vehicle identifier is one of: 1) registered with the anonymous communication system and currently active because a device that is associated with the motor vehicle identifier is logged into the anonymous communication system, 2) registered with the anonymous communication system and currently inactive because no device that is associated with the motor vehicle identifier is logged into the anonymous communication system, and 3) not registered with the anonymous communication system,
   if an indication that the motor vehicle identifier is registered and currently active is received, enable through the user interface, creation of content to be communicated, wherein the content is by default, devoid of any information that would enable identification of the user or enable another mode of communication with the user, and transmit the content to the server for retransmission to the device associated with the registered motor vehicle identifier, if an indication that the motor vehicle identifier is registered and currently inactive is received, present through the user interface a mechanism to enable creation of content, wherein the content is by default, devoid of any information that would enable identification of the user or enable another mode of communication with the user, and transmit the content to the server for storage within the anonymous communication system, and retransmission to a device associated with the motor vehicle identifier when the device associated with the motor vehicle identifier is logged into the anonymous communication system, and if an indication that the motor vehicle identifier is not registered is received, present through the user interface a mechanism to enable creation of content, wherein the content is by default, devoid of any information that would enable identification of the user or enable another mode of communication with the user, and transmit the content to the server for storage within the anonymous communication system, and retransmission to a device associated with the motor vehicle identifier if the motor vehicle identifier subsequently becomes registered with the anonymous communication system and the device is logged into the anonymous communication system.

2. The device of claim 1, wherein the processor is further configured to receive the search query through the user interface.

3. The device of claim 2, wherein to receive the search query, the processor is configured to present through the user interface:
   a mechanism for initiating a text entry of the motor vehicle identifier,
   a mechanism for initiating a visual capture of the motor vehicle identifier, and
   a mechanism for initiating an audio capture of the motor vehicle identifier.

4. The device of claim 1, wherein to enable creation of content, the processor is configured to present through the user interface:
   a mechanism for accessing a plurality of prefixed text messages for selection as the content,
   a mechanism for initiating a text entry of the content,
   a mechanism for initiating a visual capture of the content, and
   a mechanism for initiating an audio capture of the content.

5. The device of claim 4, wherein if the content corresponds to any one of a text entry, a visual capture or an audio capture, the processor is further configured to present through the user interface a mechanism for confirming the content prior to transmitting the content to the server.

6. The device of claim 4, wherein if the content corresponds to a prefixed text message, the processor is further configured to automatically transmit the content upon expiration of a time period.

7. The device of claim 6, wherein the time period is provided by a top-down counter.

8. The device of claim 1, wherein the processor is further configured to, prior to transmitting the content to the server, present through the user interface a mechanism for authorizing the server to transmit information of the user together with the retransmission of the content to the device associated with the motor vehicle identifier.

9. A server for facilitating anonymous communication by a user of a device with one or more other devices, each device associated with a motor vehicle identifier registered with an anonymous communication system, the server comprising:
   a network interface; and
   a processor coupled to the network interface, and operating in accordance with application instructions stored in a computer-readable medium, the processor configured to enable the server to:
      receive a search query from a device, the search query corresponding to a motor vehicle identifier,
      search a database for the motor vehicle identifier to determine that the motor vehicle identifier is one of: 1) registered with the anonymous communication system and currently active because a device that is associated with the motor vehicle identifier is logged into the anonymous communication system, 2) registered with the anonymous communication system and currently inactive because no device that is associated with the motor vehicle identifier is logged into the anonymous communication system, and 3) not registered with the anonymous communication system,
      transmit to the device, an indication that the motor vehicle identifier is one of: 1) registered and currently active, 2) registered and currently inactive, and 3) not registered,
      receive content from the device, wherein the content is by default, devoid of any personal information that would enable identification of the user or enable another mode of communication with the user,
      if the motor vehicle identifier is determined to be registered and currently active, retransmit the content to the device associated with the motor vehicle identifier,
      if the motor vehicle identifier is determined to be registered and currently inactive, store the content in a memory, monitor the database for a subsequent login to the anonymous communication system by a device associated with the motor vehicle identifier, and transmit the content to the device associated with the motor vehicle identifier, and
      if the motor vehicle identifier is determined to be not registered, store the content in a memory, monitor the database for a subsequent registration of the motor vehicle identifier with the anonymous communication system, and transmit the content to a device associated with the motor vehicle identifier when the device is logged into the anonymous communication system.

10. A device for facilitating anonymous broadcast communication by a user of the device with one or more other devices, each device associated with a motor vehicle identifier registered with an anonymous communication system, the device comprising:
   a user interface;
   a network interface; and
   a processor coupled to the user interface and the network interface, and operating in accordance with application instructions stored in a computer-readable medium, the processor configured to enable the device to:
      enable through the user interface, creation of content to be broadcast, wherein the broadcast content is by default, devoid of any information that would enable identification of the user or enable another mode of communication with the user;

obtain information associated with one or more devices that are associated with a motor vehicle identifier that is registered with the anonymous communication system and that are within a broadcast radius;

present the obtained information through the user interface, together with a mechanism for selecting one or more of the devices for reception of the broadcast content; and transmit the broadcast content to a server, together with an indication of the one or more selected devices to which the broadcast content is to be transmitted.

11. The device of claim 10, wherein the processor obtains information associated with one or more devices that are within a broadcast radius by being further configured to:

present through the user interface, a mechanism for selecting the broadcast radius;

transmit the selected broadcast radius to the server; and receive from the server, the information associated with each of the one or more selected devices.

12. The device of claim 10, wherein the processor obtains information associated with one or more devices that are within a broadcast radius by being further configured to:

detect the one or more devices that are within the broadcast radius by transmitting a proximity signal using a peer-to-peer communication protocol and waiting for a response from the one or more devices; and receive from each of the respective one or more devices, the information associated with that device.

13. A server for facilitating anonymous broadcast communication by a user of a device with one or more other devices, each device associated with a motor vehicle identifier registered with an anonymous communication system, the server comprising:

a network interface; and a processor coupled to the network interface, and operating in accordance with application instructions stored in a computer-readable medium, the processor configured to enable the server to:

receive a selected broadcast radius from the device;

search a database for devices within the selected broadcast radius that are associated with a motor vehicle identifier that is registered with the anonymous communication system;

transmit to the device, information for each located device;

receive broadcast content from the device, together with an indication of one or more selected devices to which the broadcast content is to be transmitted, wherein the broadcast content is by default, devoid of any information that would enable identification of the user or enable another mode of communication with the user; and transmit the broadcast content to the one or more selected devices.

14. A first device comprising:

a user interface;

a network interface; and a processor coupled to the user interface and the network interface, and operating in accordance with application instructions stored in a computer-readable medium, the processor configured to enable the first device to do the following while the first device is logged into an account of an anonymous communication system, which account is linked with a motor vehicle identifier that is registered with the anonymous communication system:

obtain information on one or more second devices, each of the one or more second devices being both of: 1) logged into an account of the anonymous communication system, and 2) within a predetermined distance of the first device;

present, through the user interface, the information on each of the one or more second devices;

select, through the user interface, at least one of the one or more second devices for receipt of anonymous communication content;

enable creation of anonymous communication content through the user interface, wherein the anonymous communication content is by default, devoid of any information that would enable identification of the first device user or enable another mode of communication with the first device user; and transmit, through the network interface, the content to a server of the anonymous communication system, together with an indication of the selected at least one second device to which the content is to be transmitted.

15. The first device of claim 14, wherein the processor obtains information on one or more second devices by being further configured to:

present through the user interface, a mechanism for selecting the predetermined distance;

transmit the predetermined distance to a server; and receive the information from the server.

16. The first device of claim 14, wherein the processor obtains information on one or more second devices by being further configured to:

detect the one or more second devices that are within the predetermined distance by transmitting a proximity signal using a peer-to-peer communication protocol and waiting for a response from the one or more second devices; and receive the information from each of the respective one or more second devices.

17. A device for storing a location of a motor vehicle having a vehicle network interface, the device comprising:

a user interface;

a device network interface configured to detect, pair with, and connect with one or more vehicle network interfaces; and a processor coupled to the user interface and the device network interface, and operating in accordance with application instructions stored in a computer-readable medium, the processor configured to enable the device to do the following while the device is logged into an account of an anonymous communication system:

detect when the device network interface connects with the vehicle network interface of the motor vehicle, after the detection, detect a continuous disconnection when the device network interface is continuously disconnected from the vehicle network interface for a predetermined period, transmit an indication of the detection of the continuous disconnection to a server of the anonymous communication system, receive, from the server, information corresponding to the location of the motor vehicle, and present, through the user interface, the information together with a mechanism for storing the information on the device.

* * * * *